US007852727B2

(12) United States Patent
Miyamoto et al.

(10) Patent No.: US 7,852,727 B2
(45) Date of Patent: Dec. 14, 2010

(54) INFORMATION RECORDING METHOD AND APPARATUS WITH SUPPRESSED MARK EDGE JITTERS

(75) Inventors: Makoto Miyamoto, Ome (JP); Tsuyoshi Toda, Kodaira (JP); Masatoshi Ohtake, Ome (JP); Motoyasu Terao, Tokyo (JP); Junko Ushiyama, Kodaira (JP); Keikichi Andoo, Musashino (JP); Yumiko Anzai, Ome (JP); Akemi Hirotsune, Higashimurayama (JP); Tetsuya Nishida, Tokyo (JP); Hideki Saga, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 434 days.

(21) Appl. No.: 12/078,227

(22) Filed: Mar. 28, 2008

(65) Prior Publication Data

US 2008/0310264 A1    Dec. 18, 2008

Related U.S. Application Data

(63) Continuation of application No. 11/170,154, filed on Jun. 30, 2005, now Pat. No. 7,417,933, which is a continuation of application No. 10/979,125, filed on Nov. 3, 2004, now Pat. No. 7,012,871, which is a continuation of application No. 10/600,442, filed on Jun. 23, 2003, now Pat. No. 6,842,415, which is a continuation of application No. 10/270,543, filed on Oct. 16, 2002, now Pat. No. 6,608,806, which is a continuation of application No. 10/023,719, filed on Dec. 21, 2001, now Pat. No. 6,529,467, which is a continuation of application No. 09/773,557, filed on Feb. 2, 2001, now Pat. No. 6,343,056, which is a continuation of application No. 09/149,051, filed on Sep. 8, 1998, now Pat. No. 6,236,635.

(30) Foreign Application Priority Data

Sep. 9, 1997    (JP)    .................. 09-243669

(51) Int. Cl.
    *G11B 7/00*    (2006.01)
(52) U.S. Cl. .................. 369/59.11; 369/59.1; 369/47.5; 369/116; 369/47.1
(58) Field of Classification Search .................. None
    See application file for complete search history.

(56) References Cited

U.S. PATENT DOCUMENTS 4,894,816 A    1/1990 Sukeda et al.

(Continued)

FOREIGN PATENT DOCUMENTS

DE    3804240    2/1988

(Continued)

*Primary Examiner*—Muhammad N. Edun
(74) *Attorney, Agent, or Firm*—Mattingly & Malur, P.C.

(57) ABSTRACT

Recording information is disclosed in which an information recording medium is irradiated with a recording energy beam that is power-modulated into at least a record power level and a record-ready power level lower than the record power level. The information is recorded on the recording medium in the form of length and interval of a mark portion. When forming a mark portion of a predetermined length, the radiation energy of the energy beam is increased as compared with when forming a mark portion of a different length before or after the first pulse of an energy beam pulse train including at least a pulse for forming the mark portion.

2 Claims, 15 Drawing Sheets

U.S. PATENT DOCUMENTS

| | | | |
|---|---|---|---|
| 5,150,351 A | 9/1992 | Ohno et al. |
| 5,323,374 A | 6/1994 | Arai et al. |
| 5,457,666 A | 10/1995 | Toda et al. |
| 5,528,564 A | 6/1996 | Kryder et al. |
| 5,732,061 A | 3/1998 | Kirino et al. |
| 5,732,062 A | 3/1998 | Yokoi et al. |
| 5,740,149 A | 4/1998 | Iwasaki et al. |
| 5,742,566 A | 4/1998 | Imai |
| 5,905,695 A | 5/1999 | Kimura |
| 6,160,784 A | 12/2000 | Maeda et al. |
| 6,205,102 B1 | 3/2001 | Spruit |

FOREIGN PATENT DOCUMENTS

| | | |
|---|---|---|
| EP | 265 971 | 5/1988 |
| EP | 802 531 | 10/1997 |
| EP | 851 413 | 7/1998 |
| JP | 62-175948 | 8/1987 |
| JP | 62-259229 | 11/1987 |
| JP | 3-185629 | 8/1991 |
| JP | 05-143993 | 6/1993 |
| JP | 06-084224 | 3/1994 |
| JP | 06-203383 | 7/1994 |
| JP | 06-295440 | 10/1994 |
| JP | 08-180414 | 7/1996 |
| JP | 8-287465 | 11/1996 |
| JP | 09-115141 | 5/1997 |

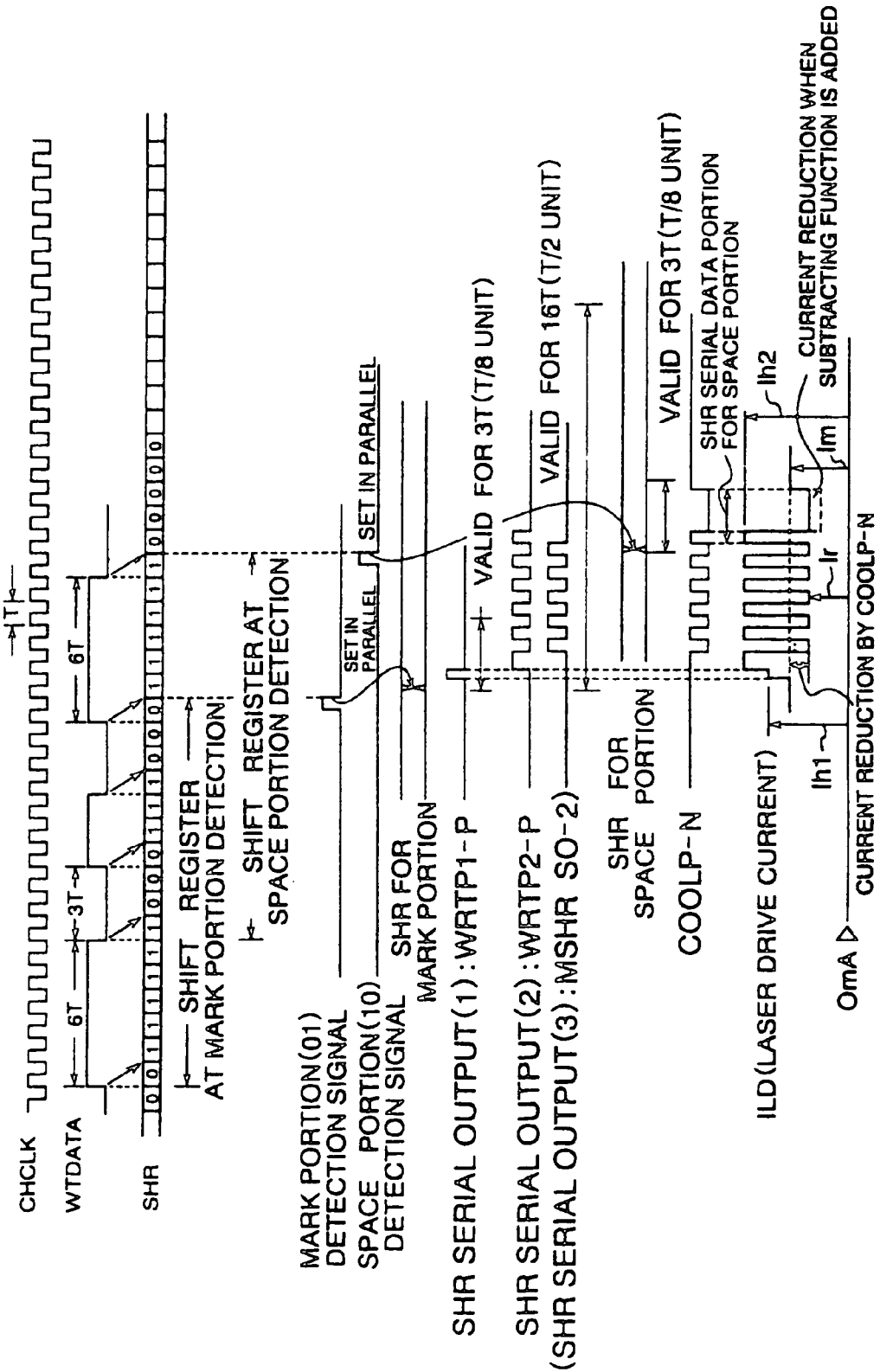

INFORMATION RECORDING METHOD AND APPARATUS WITH SUPPRESSED MARK EDGE JITTERS

This is a continuation application of U.S. Ser. No. 11/170,154, filed Jun. 30, 2005 now U.S. Pat. No. 7,417,933, which is a continuation application of U.S. Ser. No. 10/979,125, filed on Nov. 3, 2004, now U.S. Pat. No. 7,012,871, which is a continuation application of U.S. Ser. No. 10/600,442, filed on Jun. 23, 2003, now U.S. Pat. No. 6,842,415, which is a continuation application of U.S. Ser. No. 10/270,543, filed Oct. 16, 2002, now U.S. Pat. No. 6,608,806, which is a continuation application of U.S. Ser. No. 10/023,719, filed Dec. 21, 2001, now U.S. Pat. No. 6,529,467, which is a continuation application of U.S. Ser. No. 09/773,557, filed Feb. 2, 2001, now U.S. Pat. No. 6,343,056, which is a continuation application of U.S. application Ser. No. 09/149,051, filed on Sep. 8, 1998, now U.S. Pat. No. 6,236,635.

BACKGROUND OF THE INVENTION

The present invention relates to a method and apparatus for recording information in an information recording medium by radiation of an energy beam, or more in particular to an information recording method very effective for a phase change optical disk and an information recording apparatus using such an information recording method.

A conventional method of recording and erasing information in a rewritable record film is disclosed, for example, in JP-A-62-175948 (laid open Aug. 1, 1987), which uses a magneto-optical disk of an exchange couple double-layered film as a record film. Another conventional method for recording and erasing information in a rewritable record film is disclosed in JP-A-62-259229 (laid open Nov. 11, 1987), which uses a record film for a phase change optical disk capable of high-speed erasure by crystallization within substantially the same time as the laser radiation time for recording. In these cases, the power of an energy beam is alternated between at least two levels both higher than the read level, i.e. between at least a high power level and an intermediate power level. This method has the advantage that what is called "overwrite" is possible with new information recorded while at the same time erasing the existing one. Also, as disclosed in JP-A-62-259229 described above and JP-A-3-185629 (laid open Aug. 13, 1991), a record mark can be prevented from assuming a shape such that the rear portion of the record mark is wider than the front portion thereof by changing the energy beam between three levels including a high power level, an intermediate level and a power level lower than the intermediate level.

Research is under way for increasing the density of a rewritable digital video disk (DVD-RAM) using a phase change record film. In an optical disk device for performing the mark edge recording in a phase change record film such as the DVD-RAM, substantially the same temperature and substantially the same cooling rate are required for recording at every part of the outer edge where the record film is melted for forming a record mark or a mark portion in order to prevent a mark shape distortion and residue. The various record waveforms thus far known, however, fail to meet these conditions sufficiently and the feasible recording density is limited. Especially with the DVD-RAM having a recording capacity of 4.7 GB or more, the distance between centers of laser beams radiated onto a recording medium to form adjacent two mark portions thereon is small as compared with the diameter of the laser beam spot, with the result that light is considerably overlapped in distribution. It is necessary to prevent a record mark distortion caused by this phenomenon. In the case where the space portion between mark portions is short, the record mark edge position of a reproduced signal waveform shifts due to the fact that such mark portions cannot be resolved by the beam spot. This inconvenience is also required to be prevented.

With the increase in digital signal processing rate in recent years, demand has been rising for an increased recording and reproduction rate of an information recording apparatus. In order to meet this demand, a higher relative speed between an energy beam and an information recording medium has become crucial. Therefore, an information recording method is required which is capable of performing a stable recording operation even in the case where the relative speed between an energy beam and an information recording medium is high.

SUMMARY OF THE INVENTION

The object of the present invention is to provide an information recording method and apparatus capable of recording information with high density.

The invention is suitable for recording information accurately in the case where the recording density is high and/or the relative speed between an energy beam and an information recording medium is high.

On the other hand, a technique for reducing the track pitches is under development with the intention of increasing the recording density. A method exists, for example, in which information is recorded in both grooves and lands (areas between grooves) formed on an information recording medium. According to this method, crosstalks of reproduced signals from lands to grooves or from grooves to lands can be cancelled by setting the grooves to a proper depth (optical phase difference between lands and grooves).

The heat generated by the energy beam is used for recording information. Therefore, thermal interferences occur to adjacent tracks (grooves adjacent to lands or lands adjacent to grooves) in the case where the energy beam position cannot be controlled in stable fashion. This leads to the problem that the information recorded in adjacent tracks is erased.

The present invention is suitable for recording information accurately without erasing the information in adjacent tracks even in the case where the information is recorded in an information recording medium having narrow track pitches or especially an information recording medium corresponding to the land/groove recording scheme and in the case where the track pitches are not more than the diameter of the recording energy beam.

Another crucial problem is how to improve the recording sensitivity. Normally, with the increase in relative speed between the information recording medium and the energy beam, the energy beam passes a record mark on the information recording medium within a shorter time. Thus, the amount of energy radiated on the information recording medium in a unit time is reduced, and therefore the portion of the record film to be formed with a record mark is often insufficiently heated. Also, accurate recording, which can be accomplished with pulses of very narrow width, requires a high peak laser power.

The present invention is also suitable for recording information accurately without a large energy beam power in the case where the relative speed between the information recording medium and the recording energy beam is increased and/or in the case where information is recorded in an information recording medium liable to be cooled rapidly.

According to one aspect of the invention, there is provided a method of recording information in a recording medium capable of being set in a first state of a second power level and in a second state of a third power level higher than the second power level of an energy beam, in which the energy beam is radiated while moving the energy beam and the recording medium relatively to each other and information in terms of the length and interval of mark portions in the second state is recorded in the recording medium, the method comprising the first step of irradiating the recording medium with an energy beam of a first power level lower than the second and third power levels before and/or after recording the information, the second step of irradiating the recording medium with at least one pulse of one or more energy beam pulses of the third power level for forming a mark portion in the second state, and the third step of irradiating the recording medium, before or after the first pulse of one or more energy beam pulses for forming the mark portion, with an energy beam pulse of a radiation energy larger in the case where the mark portion in the second state has a first length than in the case where the mark portion in the second state has a second length.

In the above-mentioned method, the third step can be replaced by an equivalent third step of, in the case where the space portion following a mark portion in the second state has a first length, irradiating the recording medium, after the last pulse of one or more energy beam pulses for forming the mark portion, with an energy beam pulse having an energy smaller than in the case where the space portion has a second length and at a power level lower than the second power level.

In the last-mentioned method, the two third steps can of course be employed at the same time.

According to another aspect of the present invention, there is provided a method of recording information in the form of space and mark portions on a recording medium capable of assuming first and second physical states corresponding to space and mark portions of information, respectively, the recording medium being irradiated, to produce a length of a portion of the recording medium in the second physical state, with an energy beam being movable relative to the recording medium and being modulated to have power levels varying with time in a pulse waveform in accordance with a mark portion of information, wherein:

the pulse waveform includes an information pulse section having at least one pulse serving to form a second physical state recording medium portion and a mark edge adjusting pulse section continuous with the information pulse section, the mark edge adjusting pulse section being cooperative with the information pulse section to define the length of the second physical state recording medium portion to be produced.

According to still another aspect of the invention, there is provided an apparatus for recording information in a recording medium capable being set in a first state of a second power level and in a second state of a third power level higher than the second power level of an energy beam, the apparatus comprising an energy beam radiation means and means for moving the energy beam and the recording medium relative to each other, the information being recorded on the recording medium in the form of length and space of a mark portion in the second state, wherein the energy beam radiation means includes a waveform generating circuit having first means for irradiating the recording medium with a beam of a first power level (P1) lower than the second and third power levels before and/or after recording the information, second means for irradiating the recording medium with at least a pulse of one or more energy beam pulses of the third power level for forming a mark portion in the second state, and third means for increasing the radiation energy in the case where the mark portion in the second state has a first length as compared with when said mark portion in said second state has a second length, before or after the first pulse of one or more energy beam pulses for forming the mark portion.

According to yet another aspect of the invention, there is provided an apparatus for recording information in a recording medium capable of being set in a first state of a second power level and in a second state of a third power level higher than the second power level of an energy beam, comprising energy beam radiation means and means for moving the energy beam and the recording medium relative to each other, the information being recorded on the recording medium in the form of length and interval of a mark portion in the second state, wherein the energy beam radiation means includes a waveform generating circuit having first means for irradiating the recording medium with a beam of a first power level (P1) lower than the second and third power levels before and/or after recording the information, second means for irradiating the recording medium with at least a pulse of one or more energy beam pulses of the third power level for forming a mark portion in the second state, and third means for irradiating the recording medium, in the case where the space portion after a mark portion in the second state has a first length, with an energy smaller than when the space portion following the mark portion has a second length, at a power level lower than the second power level after the last pulse of one or more energy beam pulses for forming the mark portion.

In this specification, at least an energy beam pulse train for forming a mark portion is defined as a train of pulses for forming a mark portion arranged substantially equidistantly with a shorter interval than the channel clock in the recording apparatus.

BRIEF DESCRIPTION OF THE DRAWINGS

FIG. 16 shows waveforms for explaining the operation of a recording apparatus according to an embodiment of the invention.

DESCRIPTION OF THE PREFERRED EMBODIMENTS

Figure 1:
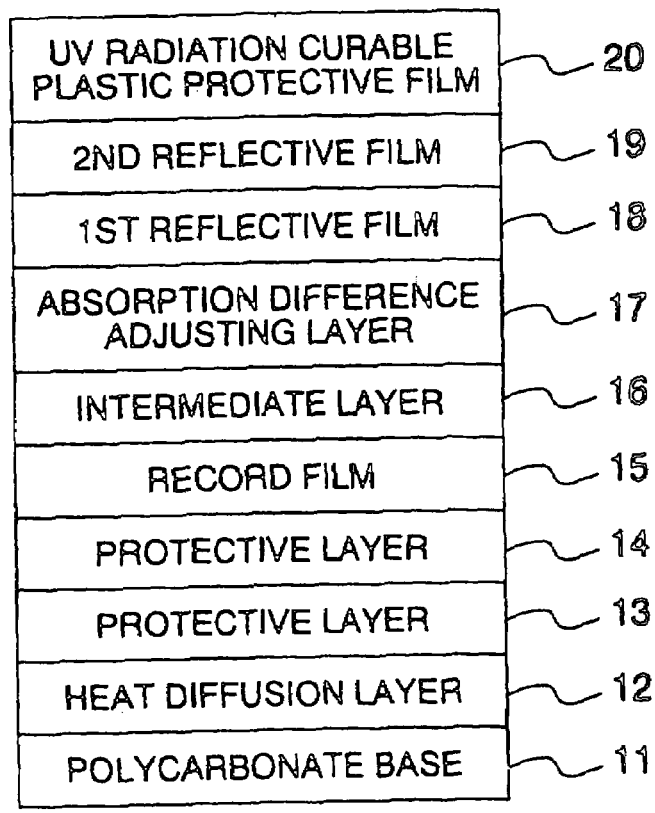
FIG. 1 is a diagram showing an example structure of a recording medium usable by the present invention.

FIG. 1 shows a sectional structure of a disk-shaped information recording medium according to an embodiment. This medium can be fabricated in the following manner.

First, a polycarbonate base 12 cm in diameter and 0.6 mm in thickness having tracking guide grooves for land/groove recording at pitches of 0.6 µm in the surface thereof is formed with an $Al_2O_3$ heat diffusion layer 12 about 30 nm thick. An $80ZnS-20SiO_2$ protective layer 13 about 45 nm thick is formed. A $SiO_2$ protective layer 14 about 5 nm thick is formed. Then, a $Ge_{14}Sb_{28}Te_{58}$ record film 15 about 15 nm thick and a $SiO_2$ intermediate layer 16 about 5 nm thick are formed. Further, an absorption difference adjusting layer 17 about 18 nm thick made of an $80Mo-20SiO_2$ film is formed, followed by a first reflective layer 18 of 89Al-11Ti about 70 nm thick and a second reflective layer 19 of 97Al-3Ti film about 70 nm thick, in that order. A layered film can be formed by a magnetron sputtering device. A protective film 20 is formed on the resulting assembly using an ultraviolet radiation curable resin. In this way, a first disk member is prepared.

In exactly the same manner, a second disk member having the same configuration as the first disk member is prepared. The first disk member and the second disk member are attached to each other by the ends thereof nearer to the second reflective film through an adhesive layer, thereby fabricating a disk-shaped information recording medium.

The record film 15 of the first disk member constituting the recording medium fabricated in the above-mentioned way is initialized in the manner described as follows. This is exactly the case with the record film of the second disk member. The description that follows, therefore, will be made only about the record film 15 of the first disk member.

The medium is rotated at a constant linear velocity of 8 m/s, and laser beam power of 900 mW of a semiconductor laser (wavelength of about 810 nm) having an elliptical spot along the radius of the medium is radiated on the record film 15 through the polycarbonate base 11. The recording head is driven while automatically focusing the laser beam on the record film 15. The laser beam spot is displaced by one sixteenth of the spot length each time along the radius of the medium. In this way, the medium is crystallized (the first physical state).

Information is recorded by an 8-16 modulated signal in a record area of the record film initialized in the above-mentioned manner. The rotational linear velocity of the disk is 9 m/s, the semiconductor laser wavelength is 635 nm, and the lens numerical aperture (NA) is 0.6. First, the tracking and the automatic focusing are effected with a laser beam of a first power level P1 (1 mW) constituting a read power level while radiating the disk. When the beam reaches the disk portion to be recorded in, the laser beam power is raised to a second power level for erasing the unrequired written information by crystallization. For forming a record mark, i.e. a mark portion anew, the power is further raised to a third level. The record waveform for forming this record mark (hereinafter referred to as "the mark portion") will be described in detail later. After a multiplicity of mark portions in amorphous or similar state (second physical state) are completely formed and the record area is passed, the laser beam power is lowered to the first power level.

The power ratio between the third power level and the second power level is preferably 1:0.3 to 1:0.8.

In this recording method, new information can be recorded by overwriting it directly on the old information recorded in the particular portion. In other words, an overwrite operation with a single circular light spot is possible.

There are 36 zones available for recording by the user along the radial direction of the disk. About 25 to 60 sectors exist along the circumference of each zone. For the record-reproduce operation, the motor is controlled by a ZCLV (Zone Constant Linear Velocity) method in which the rotational speed of the disk is varied from one zone to another for recording or reproduction. In this format, therefore, the disk linear velocity is different between the innermost circumference and outermost circumference in each zone.

The configuration and operation of a recording apparatus according to this embodiment will be explained with reference to FIG. 2.

Information (digital signal) inputted from outside the recording apparatus is transmitted to an 8-16 modulator in units of 8 bits. In recording the information on a disk 1, for example, 8 bits of information is converted to 16 bits of information by use of a recording method called the 8-16 modulation scheme. In this modulation scheme, information of 3T to 11T in mark length corresponding to 8-bit information is recorded on the disk (medium) 1 rotationally driven by the motor 2. In FIG. 2, the 8-16 modulator 8 performs the modulation for this purpose. In the foregoing description, T designates a clock period for information recording and is 15.6 ns in the case under consideration. A preferable value of T in the method according to this embodiment is in the range between 5 ns and 20 ns inclusive.

The digital signal of 3T to 11T converted by the 8-16 modulator 8 is transferred to a record waveform generating circuit 6 thereby to generate a record waveform. The basic width of each pulse constituting a pulse train of the third power level for forming a mark portion is assumed to be T or T/2, and the width of the pulse lower than the second power level following the pulse train, i.e. the cooling pulse width Tc can be changed from outside. The record waveform containing the pulse train generated by the record waveform generating circuit 6 is transferred to a laser driving circuit 7, which emits a semiconductor laser in an optical head 3 based on the same record waveform.

In the optical head 3 mounted on the recording apparatus, the laser beam is circularly polarized. This recording apparatus corresponds to what is called the land/groove recording scheme in which information is recorded in both grooves and lands (areas between grooves). In this recording apparatus, either the lands or the grooves can be arbitrarily selected for tracking by a land/groove servo circuit.

The recorded information can also be reproduced by use of the optical head. A laser beam focused to the same size as at the time of recording is radiated on the disk, and the light reflected from the mark portion and the portion (space portion) other than the mark portion is detected thereby to obtain a reproduced signal. The amplitude of this reproduced signal is amplified by a pre-amplifier 4 and transferred to an 8-16 demodulator 10. The 8-16 demodulator 10 converts each 16 bits into 8-bit information. The foregoing operation completes the reproduction of the mark portion recorded.

Figure 3:
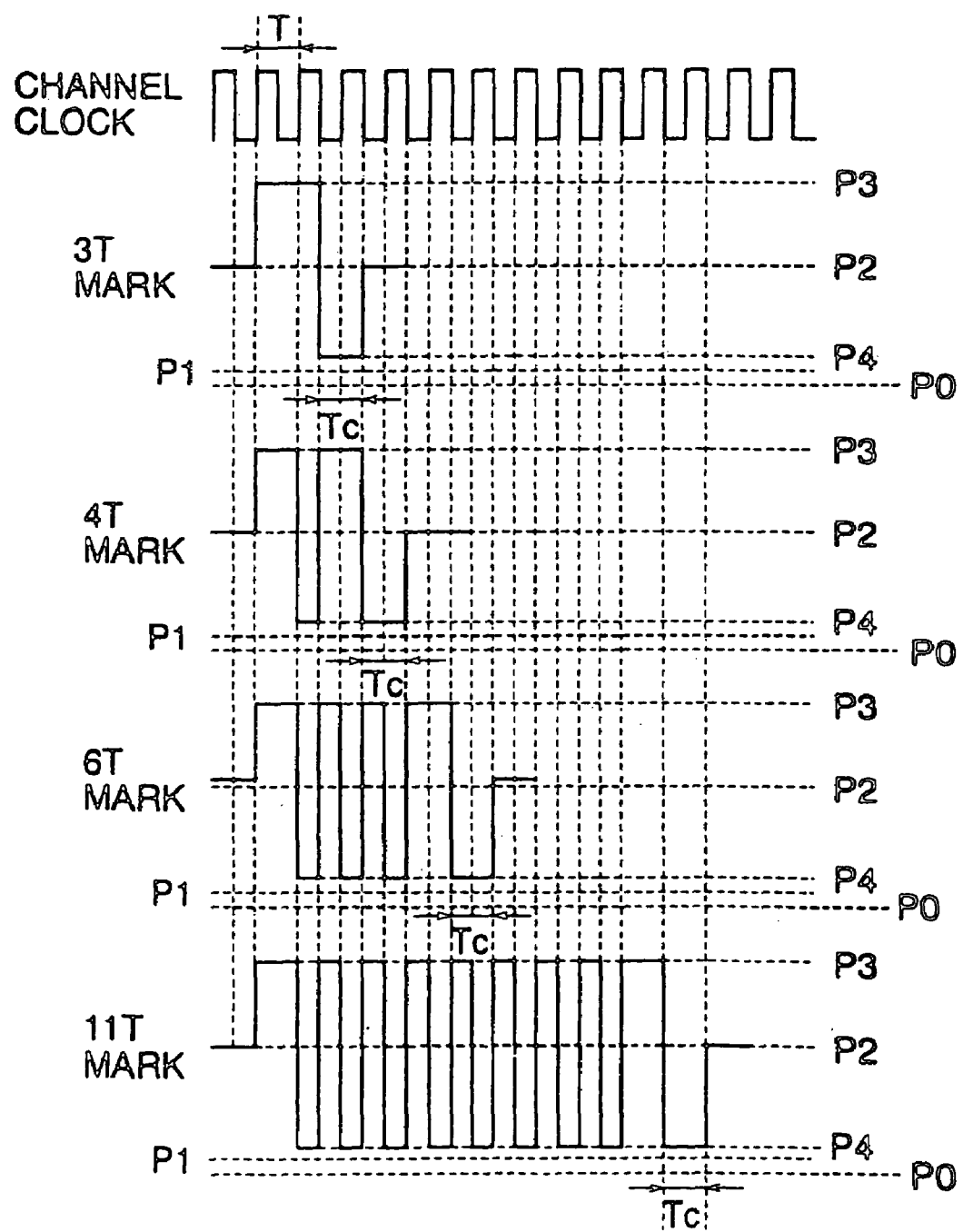
FIG. 3 shows waveforms for explaining the information recording according to the prior art.

FIG. 3 shows a well-known record waveform as a reference. FIGS. 4 to 9 are diagrams for explaining record waveforms according to an embodiment of the invention. In FIG. 3, P3 designates the power of the third power level capable of forming a mark portion, P2 the power of the second power level for achieving the crystallization of the record film of the medium, and P1 the power of the first power level for read operation. Between the pulses where a high power level is reached for forming a mark portion, the power is lowered for preventing the heat accumulation. T designates the width of a channel clock. The basic width of the laser beam pulse radiated on the medium is T/2, and the pulse interval is also T/2. (In FIG. 3, the width of the first pulse and the last pulse is substantially T in the pulse train for forming a mark portion.) FIG. 3 shows only the laser beam pulse waveforms for forming mark portions of 3T, 4T, 6T and 11T. The mark portions of 5T to 10T, on the other hand, are formed by adding a set of waveforms including T/2 high power level and T/2 low power level, respectively, following the first pulse of the waveform of 4T. The mark portion of 11T, for example, is the result of addition of seven sets. A pulse train longer than 11T can be obtained by adding waveforms in similar fashion.

As described above, except for the waveform for the 3T mark, the width of the first pulse of the laser beam pulse train is given as 1T, the width of the last pulse also as 1T, and the width of other pulses as T/2. After the last pulse of the beam pulse waveform for forming a particular mark portion, the record film is preferably cooled by lowering the laser power to a level lower than the second power level. This pulse of low power level is called the cooling pulse. The power level reached by this pulse is assumed to be a fourth power level. Also assume that $P1=1$ mW
$P2=5$ mW
$P3=10.5$ mW
$P4=0.5$ mW Then, both the leading edge jitter and the trailing edge jitter represent a rather satisfactory range of 20% to 25%, but a target jitter value of not more than 10% cannot be achieved. Tc designates the width of a cooling pulse and Po a reference power level.

The examination by the present inventors has revealed that the above-mentioned jitters occur due to the following causes:

(1) The leading edge of the mark portion of 5T to 7T is displaced about 2.0 nm (or delayed by about 2 ns in terms of electrical signal pulse) from a predetermined position in such a direction as to shorten the length of the mark portion.

(2) The leading edge of the mark portion recorded before a short space portion (3T to 5T) is displaced by about 5 nm (or delayed by about 5 ns in terms of electrical signal pulse) in such a direction as to shorten the length of the mark portion.

(3) When a 3T mark portion or a 4T mark portion is recorded, the leading edge is shifted forward (in the direction advanced in time).

The reason why this phenomenon occurs has been vigorously studied by the present inventors. As a result, with a recording medium for recording (converting into amorphous state) and erasing (crystallizing) the information changing the phase by controlling the medium temperature to two areas (the temperature area for crystallization and the temperature area of not lower than the melting point), it has been discovered that a mechanism hitherto unknown works especially when recording a mark not more than one half of the diameter of the laser beam spot. Specifically, (1) Assume that after a first mark portion is recorded at the third power level in a given position A of the medium, the center of the laser beam is moved from position A by a distance between about one half the radius and the full radius of the laser beam spot. In the case where the second mark portion is recorded again at the third power level, it has been found that the first mark portion is crystallized and the mark (amorphous state) disappears.

(2) The feature of the conventional waveform shown in FIG. 3 is that when recording a mark portion of a length not less than 5T, the amount of energy radiation of the first pulse and the last pulse of a beam pulse train for forming a mark portion is twice as large as that of the pulses held between the first and last pulses. In the record waveform for recording 3T or 4T mark portions, therefore, the proximity between or integration of the first and last pulses causes an excessive amount of energy radiation, with the result that the mark portion undesirably outgrows a predetermined size.

(3) It is further known that a phenomenon of what is called an inter-code interference occurs in which in the case where the length of the shortest mark (space) portion is not more than one half of the diameter of the laser beam spot, the edge position determined by slicing the reproduced signal of the shortest mark (space) portion interposed between sufficiently long space (mark) portions is considerably different from the edge position determined by slicing the reproduced signal of the shortest mark (space) portion interposed between the shortest space (mark) portions.

An object of the present invention is to predict and record these phenomena and thereby to make possible an ultrahigh density recording with the length of the shortest mark (space) portion not more than one half the diameter of the laser beam spot.

Figure 4:
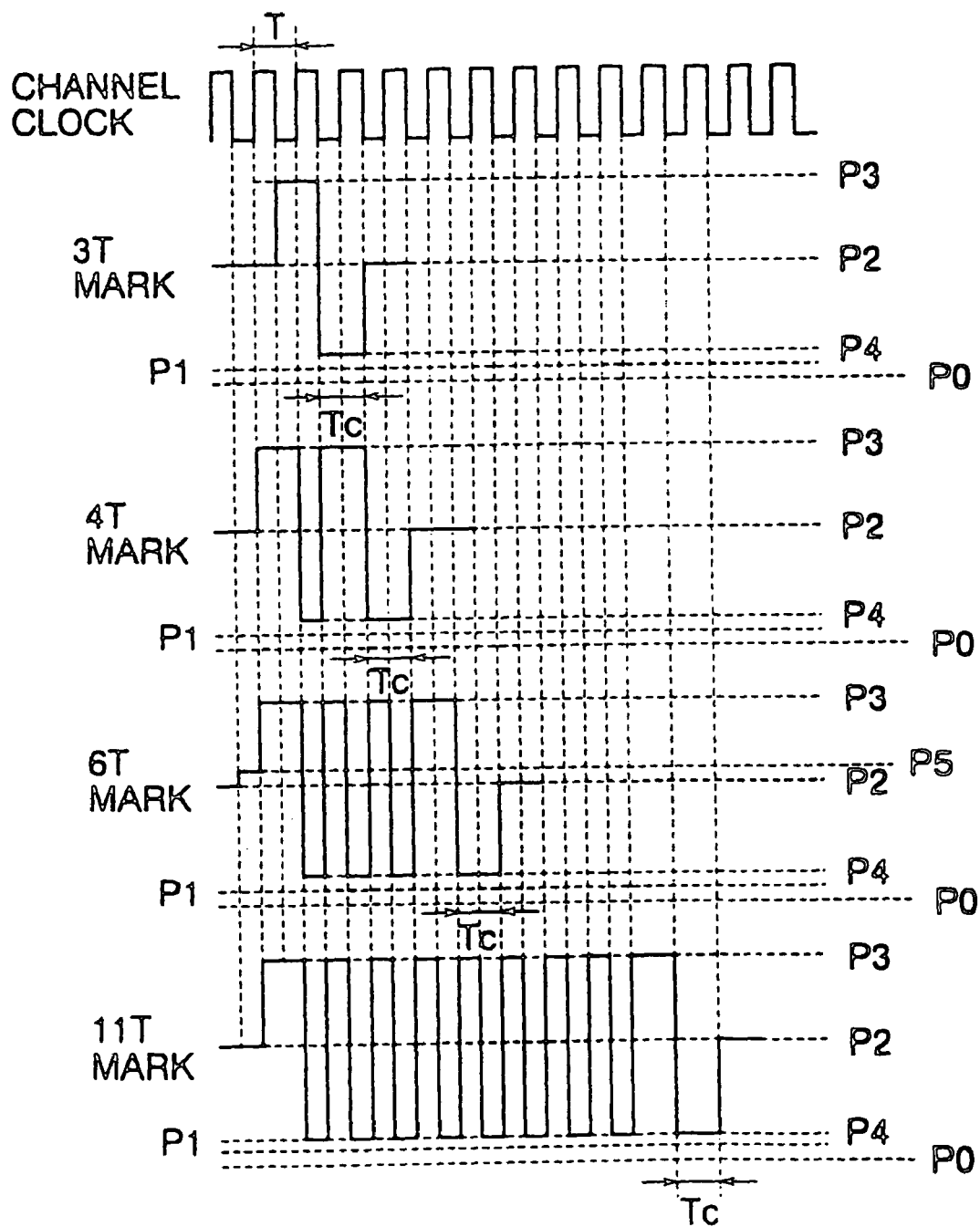
FIGS. 4 to 7 show waveforms for explaining the information recording according to other embodiments of the invention.

In the energy beam pulse waveform shown in FIG. 4, the power is at the second level P2 of 5 mW, for example, before a mark portion is formed. When the beam reaches a position for forming a mark portion, the power rises toward and reaches the third power level P3 of 10.5 mW, for example. The radiation of the laser beam of the third power level melts the record film, which is then rapidly cooled into an amorphous state (second physical state). In order to lower the radiation energy of the energy beam pulse waveform for recording the 3T mark portion, the laser of the 1T-wide third power level is radiated for recording.

In the case where the mark portion to be recorded is of the length of 5T, 6T or 7T, the energy beam pulse waveform has a mark edge adjusting pulse before the pulse train (information pulses) for forming a mark portion. Specifically, the energy beam is raised to a fifth power level P5 0.1 mW higher than the second power level P2 before being raised to the third power level P3. After being kept at this level for the following-described time, the energy beam is raised to the third power level P3. The rise of energy level (i.e. preheating) from the power level P2 to power level P5 is effective as in the following case if in the range of 0.05 mW to 2.0 mW (i.e. about 0.1% to 36.4%) when third power level (P3) less second power level (P2) is 5.5 mW. The time after reaching the fifth power level P5 before being raised to the third power level is preferably 0.1T to 1.5T for the 5T mark portion, 0.1T to 2.0T for the 6T mark portion, and 0.1T to 1.5T for the 7T mark portion. By securing these ranges, partial erasure of the mark portion by a succeeding beam pulse can be avoided. As a result, the jitter at the leading edge can be reduced to 10% or less.

Instead of changing the time after reaching the fifth power level P5 before being raised to the third power level P3 according to the length of the mark portion, the fifth power level P5 can be changed according to the mark portion length within the range of power level described above, in such manner that P5 (6T)>P5 (5T)>P5 (7T). In this way, the leading edge jitter can be suppressed in similar fashion. The mark portion length subjected to preheating is not limited to 5T, 6T, 7T but can include 3T, 4T or 8T.

Without raising the power level as described above, as shown in FIG. 5 for the 5T, 6T and 7T mark portions, the power is lowered from second power level P2 to sixth power level P6 with a mark edge adjusting pulse inserted following the first pulse in the energy beam pulse train (information pulse train) high in power level for forming a mark portion, and after the second pulse in the same pulse train, the fourth power level P4 is reached as a mark length adjusting pulse. When the fourth power level is 1 mW, the sixth power level P6 is raised from the fourth power level P4 by an amount between 0.05 mW and 5.0 mW inclusive. In this way, a similar effect of suppressing the leading edge is obtained. A preferred example of power difference between the sixth power level P6 and the fourth power level P4 is 0.05 mW to 3 mW for 5T mark, 0.10 mW to 5.0 mW for 6T mark, and 0.05 mW to 3.0 mW for 7T mark.

Figure 6:
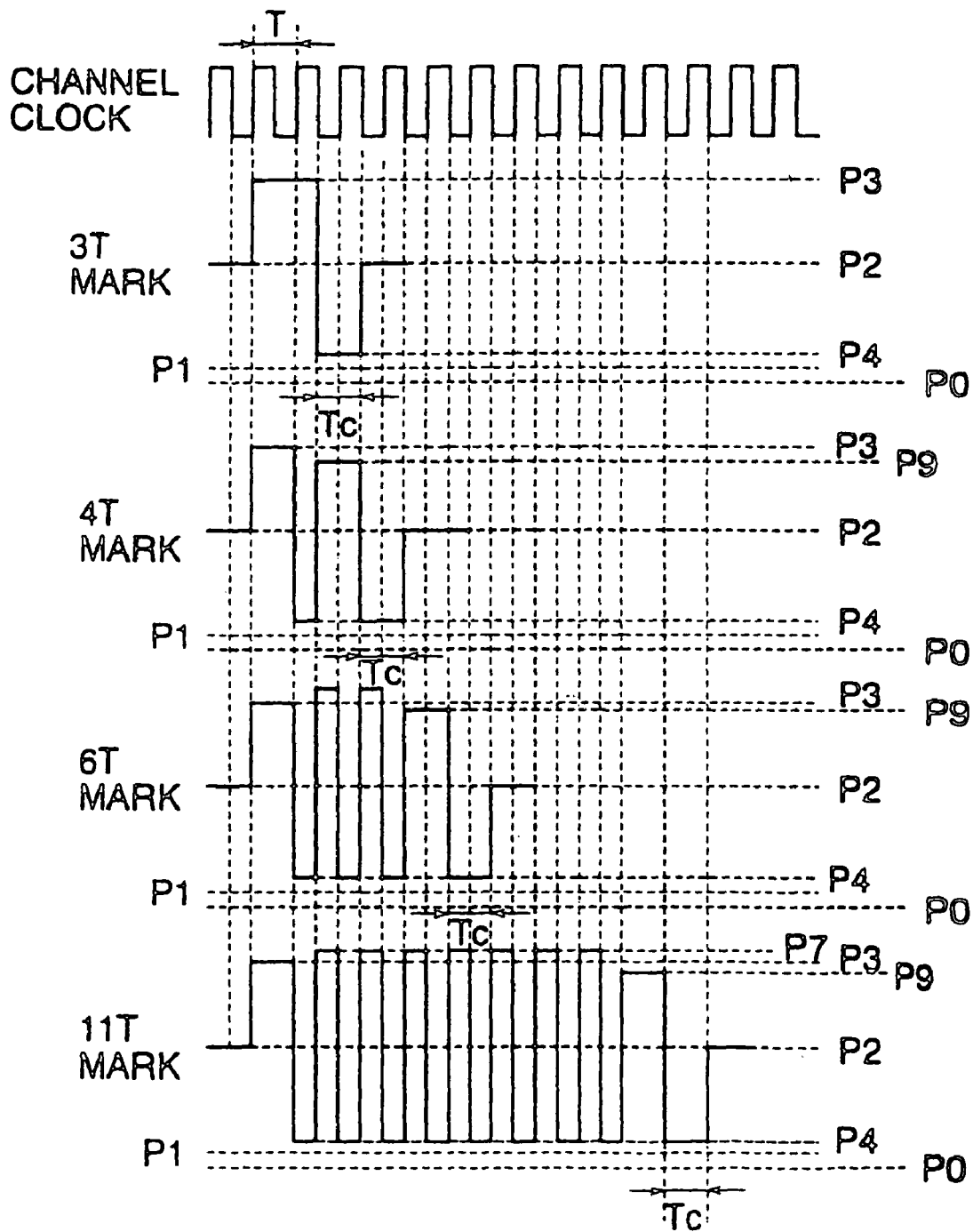

Reference is made to FIG. 6. The high power level that the first pulse in the energy beam pulse train (information pulse section) reaches for forming a mark portion is the third power level P3. Assume that the power level of the second pulse to the last pulse but one in the pulse train is the seventh power level P7, and the power level of the last pulse is the ninth power level P9. The third, seventh and ninth power levels can be the same. When the seventh power level P7 is higher than the third power level P3 by 0.1 mW to 2.0 mW for the level P3 being 10.5 mW, however, the leading edge of the mark portion is advantageously prevented from growing excessively. Thus, the leading edge jitter can be suppressed to 12.5%. In the case where the ninth power level P9 is lower than the seventh power level P7 by 0.1 mW to 2.0 mW for the level P7 being 10.5 mW, on the other hand, the leading edge jitter is advantageously lowered. As a result, the leading edge jitter is suppressed to 12%.

Figure 7:
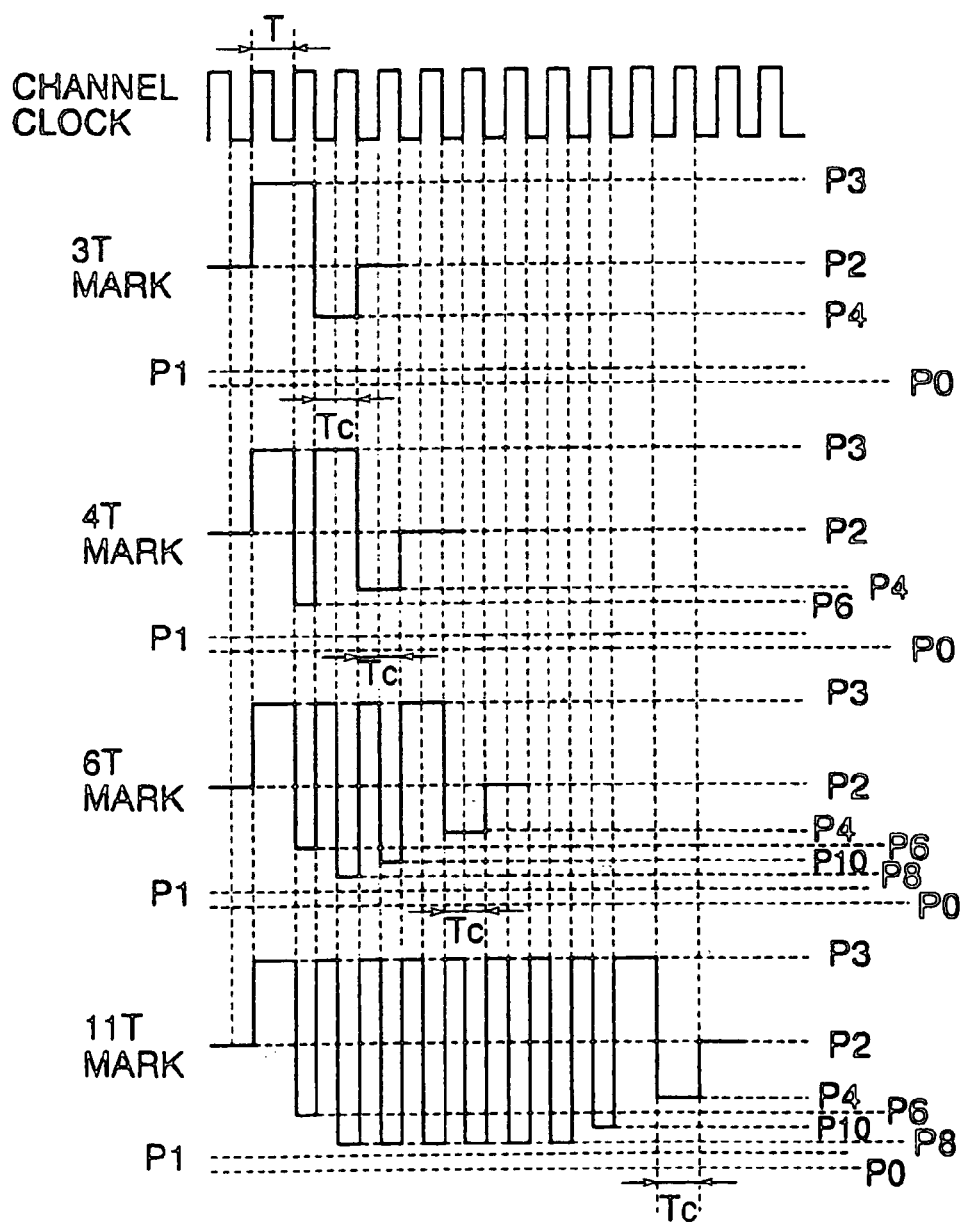

Referring to FIG. 7, assume that the power level reached by lowering from the high power level P3 for forming a mark portion is the tenth power level P10 different from other pulses immediately before the last pulse and this power level P10 is raised to a level 0.1 mW to 2.0 mW higher than the level between the second pulse and the last pulse but one, i.e. the eighth power level. Then, the leading and trailing edge jitters can be reduced. Consequently, the average jitter at the leading and trailing edges can be suppressed to 7.5%.

In FIG. 7, at least one of the fourth, sixth, eighth and tenth power levels P4, P6, P8 and P10, especially, the eighth power level P8, if lower than the first power level P1 providing a read power level, can be preferably realized simply by turning off the high frequency superposition of the semiconductor laser as the same amplifier output voltage as the first power level P1.

Figure 8:
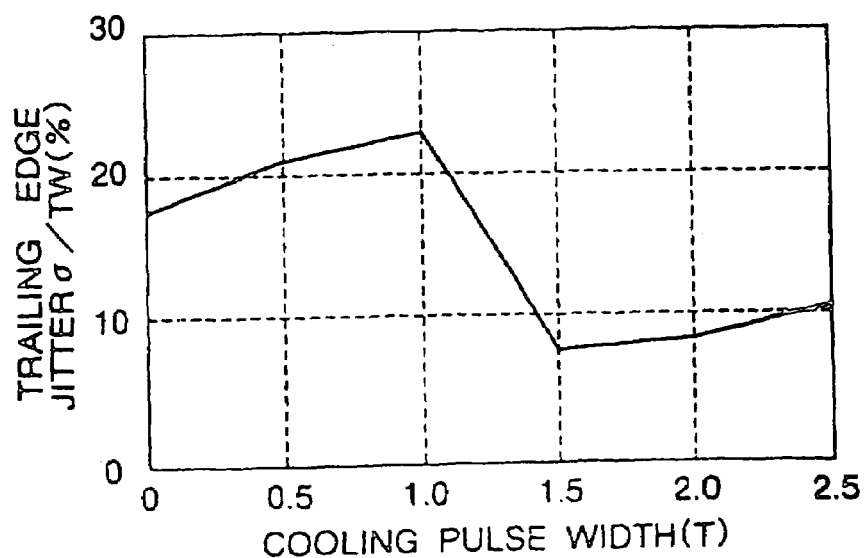
FIG. 8 is a diagram showing the relation between the width of a cooling pulse and the trailing edge jitter of a mark portion according to an embodiment of the invention.

Trailing edge jitters are determined with the width Tc of the cooling pulse being changed at intervals of T/2 during a period from 0T to 2.5T, the cooling pulse constituting a mark edge adjusting pulse section of the energy pulse waveform. The energy beam pulse waveform is such as shown in FIG. 3, in which the individual power levels are: P1=1 mW, P2=5 mW, P3=10.5 mW and P4=0.5 mW. FIG. 8 shows the dependency of the trailing edge jitter on the cooling pulse width. In the case where Tc is 0T, the jitter value is 18%, which changes to 8% when Tc is 1.5T. In this way, a superior reproduced signal can be obtained by optimizing the cooling pulse width Tc.

Figure 9A:
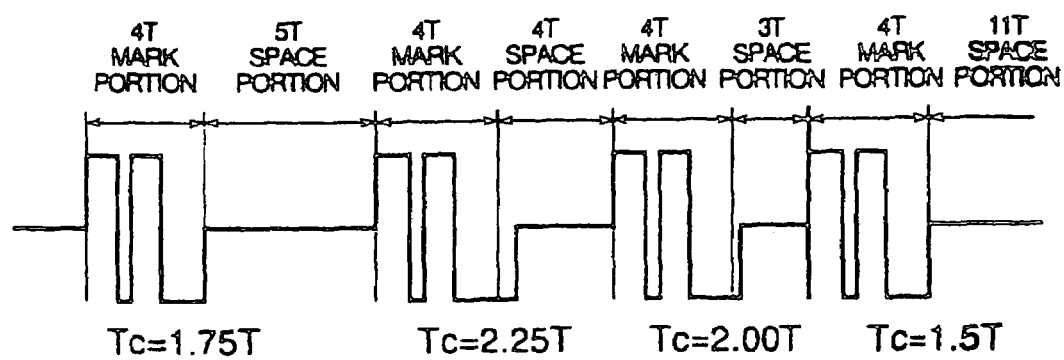
FIGS. 9A, 9B, 10A, 10B show waveforms for explaining the information recording according to other embodiments of the invention.

As shown in FIG. 9A, the cooling pulse width Tc in the energy beam pulse train (pulse waveform) for recording a mark portion may be made larger when recording information with the second shortest space portion of 4T than when recording information with a space portion of other lengths. Then, the shift of the edge position which otherwise might be caused by the insufficient resolution of the beam spot is prevented and a superior reproduced signal can be produced.

For example, the cooling pulse width Tc may be 2.25 T for recording a mark portion followed by a space portion of 4T and may be 1.75 T, 2.00 T, 1.5T, etc. for recording a mark portion followed by a space portion of another length. Then, the trailing edge jitter will be 6%. A similar effect of trailing edge jitter suppression is obtained by setting the duration of low power between 2 ns and 8 ns inclusive.

Depending on the width or the power level of the cooling pulse, the edge position may be controlled more sufficiently by shortening the cooling pulse width or raising the power level of the cooling pulse in the case where the length of the space portion is short (4T to 5T). This is because in the case where the cooling pulse width is sufficiently large or the power level is sufficiently low, the preheating and hence energy runs short for recording the leading portion of a succeeding mark portion. In such a case, the cooling pulse width Tc should be made shorter when recording a mark portion followed by a space portion of 3T to 5T than when recording a mark portion followed by a space portion of 6T or more, thereby preventing jitters.

According to another aspect of the invention, the change in the shape of mark portions before and after a space portion depending on the length of the space portion is compensated for in advance. Therefore, the cooling pulse information is conveniently provided in relation to the length of the space portion. A specific example will be described below.

Figure 2:
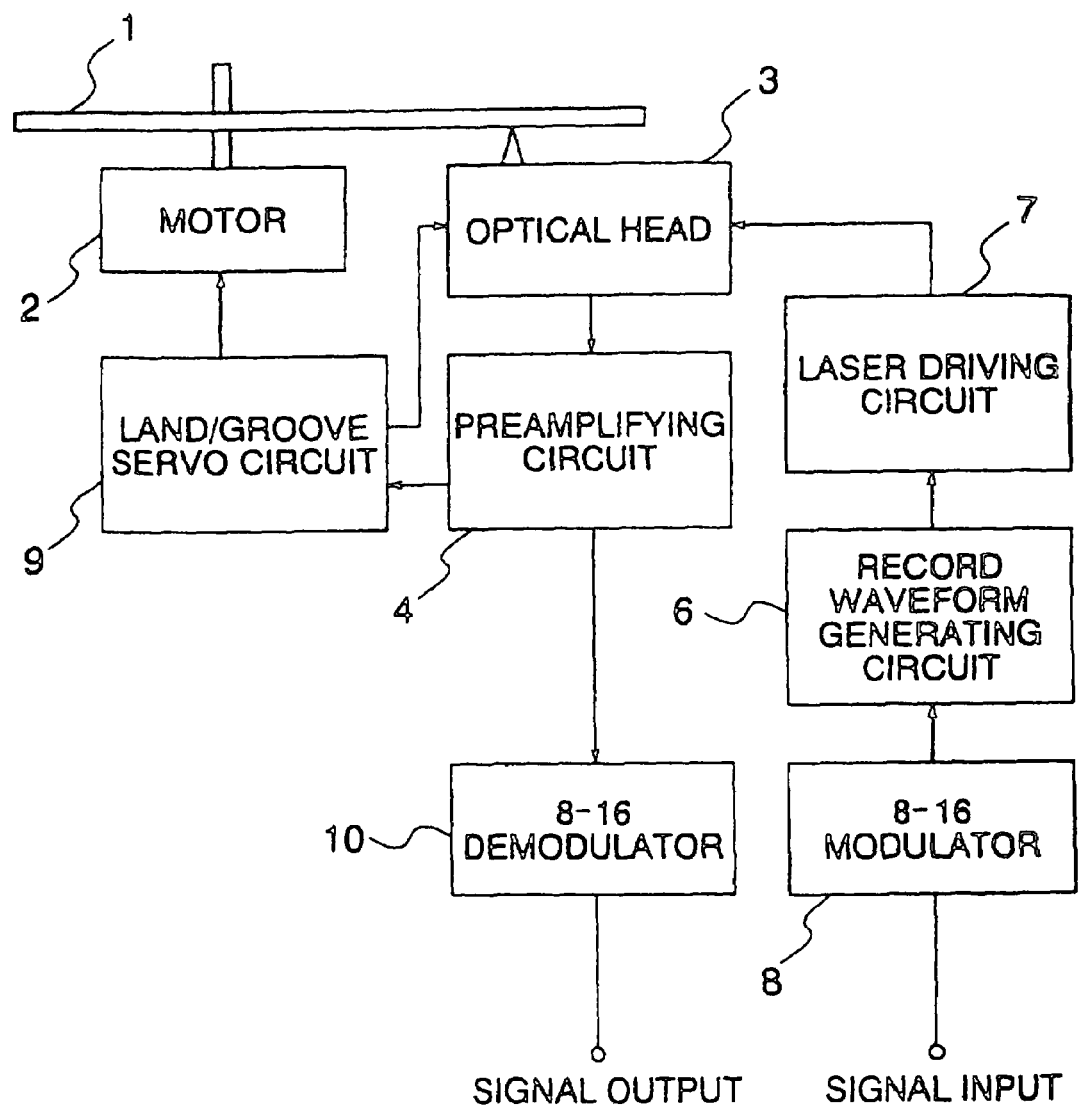
FIG. 2 is a block diagram showing a recording apparatus according to an embodiment of the invention.

In the record waveform generating circuit 6 shown in FIG. 2, the 8-16 modulation signal sent from the 8-16 modulator 8 is usually binarized (distinguished between "0" and "1"). Thus, a pulse train waveform for recording the mark portion of a length corresponding to the length of "1" level on the disk 1 is generated on the one hand, and a record waveform for radiating the power level for crystallizing a length corresponding to the length of "0" level (the length of the space portion) is produced on the other hand. In the process, generally, a pulse train waveform corresponding to the length of each mark portion is stored in a mark table, and a pulse train waveform corresponding to the length of the mark portion is generated. The space portion of the disk 1 is irradiated with a beam of a predetermined erase power (second power level).

When an attempt is made to record information using a mark table as described above, the recording of a mark portion requires a mark table describing combinations of the length of a mark portion to be recorded and the length of the space portions before and after the mark portion. In the presence of a mark portion and a space portion of 3T to 11T, for example, it is necessary to store a maximum of 162 types of pulse train waveforms in the mark table, to determine a combination of a mark portion and a space portion and to access an appropriate pulse train waveform from among the above-mentioned record waveforms.

Figure 9B:
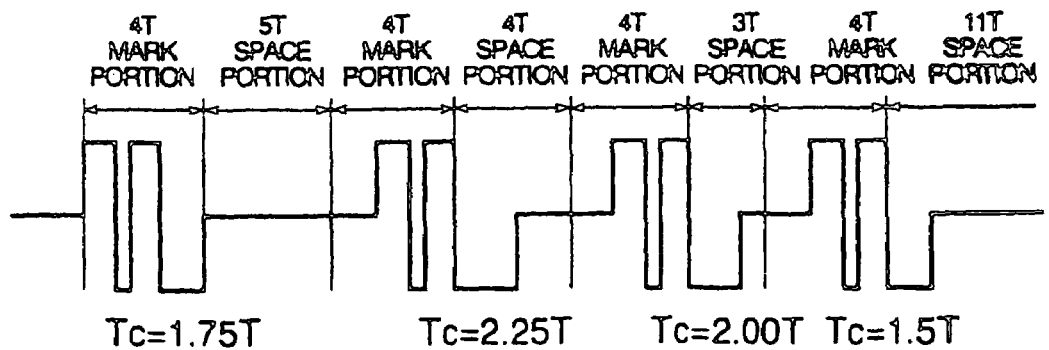

In the information recording apparatus according to this embodiment, in contrast, a pulse train waveform including a pulse of third power level capable of recording a mark portion is generated for the mark portion, and a combination of cooling pulse power and erase power corresponding to the length of each space portion is radiated on the space portion (FIG. 9B). Specifically, a mark table and a space table are arranged in the record waveform generating circuit 6, so that a pulse train waveform corresponding to the length of the mark portion is called from the mark table, and a cooling pulse waveform corresponding to the length of the succeeding space portion is called from the space table. By doing so, a multi-pulse waveform having an optimum cooling pulse is generated.

In this way, the waveforms to be stored in the mark table and the space table can be limited to nine types. Therefore, the record waveform generating circuit can be simplified, thereby contributing to a lower cost of the information recording apparatus. (This system will hereinafter be referred to as "the mark/space independent table system").

Figure 10A:
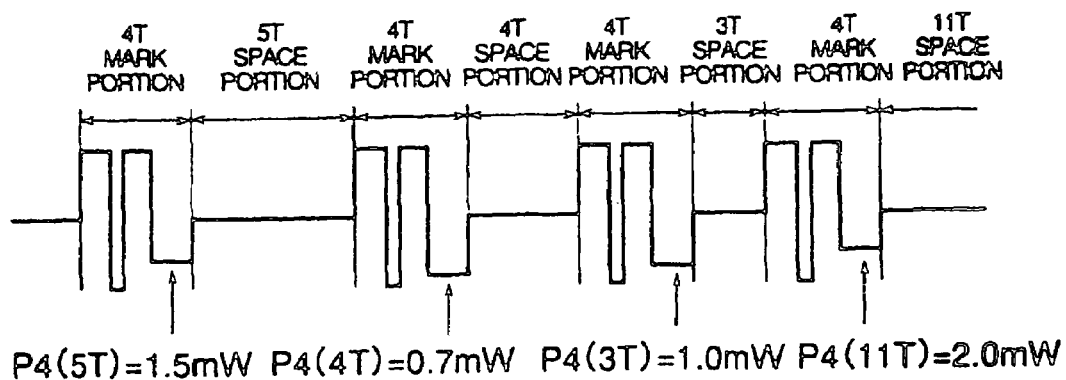

Referring to FIG. 10A, instead of changing the width of the cooling pulse of an energy beam pulse train (pulse waveform) for recording a mark portion according to the length of the space portion immediately following the mark portion, a similar effect of trailing edge jitter suppression is obtained by maintaining the cooling pulse width at a constant level and changing the power level like P4 (3T) or P4 (4T) according to the length of the space portion immediately following the mark portion. In FIG. 10A, the power level of the cooling pulse for recording a mark portion followed by a 4T space portion is made minimum. After the end of the cooling pulse, the power is changed to the second power level P2. Even during the above-mentioned cooling pulse, the crystallization occurs when the record film temperature drops to the crystallization temperature range. After that, however, the second power level P2 is held, and therefore the area having a recorded mark portion is stably crystallized into the first physical state, thus erasing the information stored therein. Assume that the distance between a given mark portion and the next mark portion is small, however, e.g. that the space portion is 3T. In the case where the second power level following the cooling pulse for the preceding mark portion is P2 (3T) which is 0.1 mW to 1.0 mW lower than the second power level for the other mark lengths, residue or shift of the leading edge of the mark portion can be prevented and the jitter of the trailing edge becomes 10%.

Figure 10B:
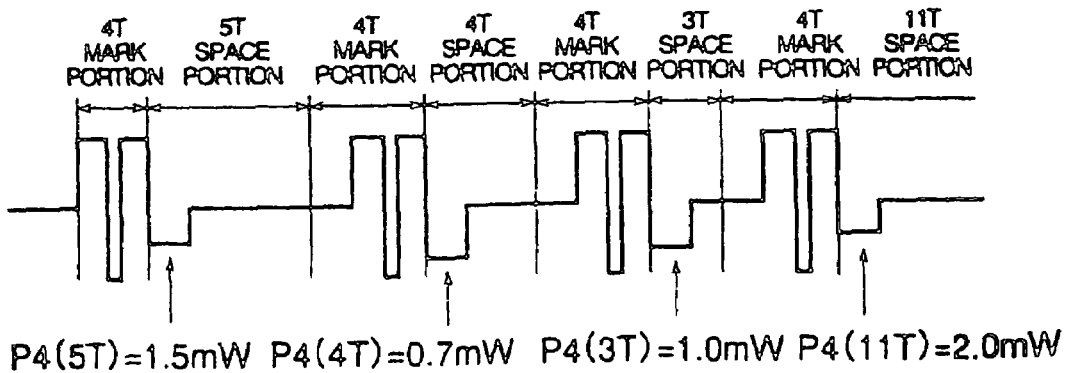

Also, as shown in FIG. 10B, the information recording apparatus can be reduced in cost by providing a mark table and a space table for optimally controlling the power level of the cooling pulse according to the mark/space independent table system.

Since the mark table and the space table are dependent on the information recording medium (disk), a trial write operation (the operation of determining an optimum mark table and an optimum space table for each information recording medium) can be simplified by recording an optimum mark table and an optimum space table in the information recording medium in advance.

The cooling rate of a rear or trailing part of a mark portion can be controlled by changing the width or level of the low-power part (cooling pulse) following the last pulse of an energy beam pulse train for forming a mark portion and hence by changing the energy radiated on the particular part. The shape of the mark portion can thus be optimized.

Also, if the product of the time for which the low-power part is irradiated and the relative speed between the energy beam and the information recording medium is not more than one third of the diameter of the energy beam spot (the distance of an area along the recording track where the intensity of the energy beam is the central intensity multiplied by $\exp(-2)$), the distortion of the reproduced signal is reduced especially to a small value and therefore the system is most suitable for high density recording. In the case where the product of the time for which the low-power portion is irradiated and the relative speed between the energy beam and the information recording medium is not less than one third of the diameter of the energy beam spot, on the other hand, the erasure by the second power level (crystallization for the phase change record film) may not be sufficiently accomplished.

Figure 11:
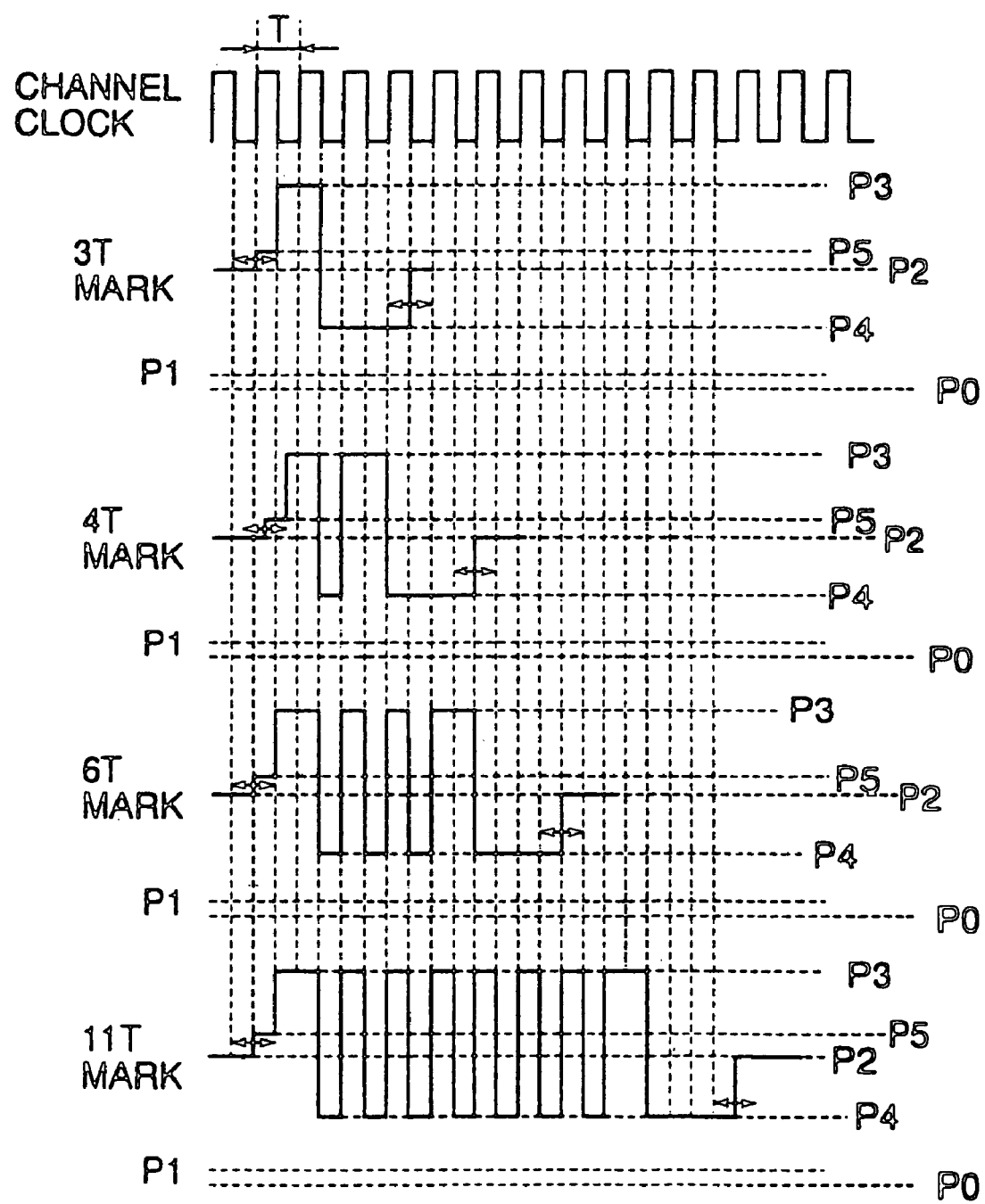
FIGS. 11 and 12 show waveforms for explaining the information recording according to other embodiments of the invention.

FIG. 11 shows an example of a combination of the aforementioned waveform control schemes.

The energy beam pulse waveforms shown in FIG. 11 have the highest practical value among the embodiments, and can effectively suppress the jitters. In the energy beam pulse waveform used for information recording, a jitter value of 9% or less can be obtained by using four power levels including P2, P3, P4 and P5 having the above-mentioned relation. FIG. 11 shows only the mark portions having the length of 3T, 4T, 6T, 11T. In the mark portions having the length of 5T to 10T, however, a set of waveforms each having a combination of a high power level pulse and a low power level pulse is added for each T/2 following the first pulse of the 4T waveform. The result of adding seven such sets is an energy beam pulse train for recording a mark portion having the length of 11T. Pulses are added similarly also for the mark portions longer than 11T. As described above, of all the pulses having a sufficient energy to make an amorphous record film, i.e. the information pulse section of the energy beam pulse waveform, the width of the first pulse is set to 1T, the width of the last pulse to 1T and the width of other pulses to T/2. Also, a pulse of preheat level P5 with the duration of 0 to 2T higher than P2 and lower than P3 in power level is arranged immediately before the first pulse of power level P3. The width of this pulse of preheat level P3 is changed in accordance with the cooling rate of the medium, the relative speed between the laser beam and the medium, the relation between the radius of the laser beam and the length of the mark portion or the length of the space portion adjacent to a mark portion. As an example, the conditions for the width and power level of each pulse are shown below. (Power level of pulse train of information pulse section)

P2: 4.5 mW

P3: 10.5 mW

P4: 1.5 mW

P5: 4.6 mW (Width of the Cooling Pulse in the Mark Edge Adjusting Pulse Section)

Width of the cooling pulse contributing to recording of a mark portion immediately before a space portion 3T, 4T wide: 2.25T Width of the cooling pulse contributing to recording of a mark portion immediately before a space portion 5T wide: 2T Width of the cooling pulse contributing to recording of a mark portion immediately before a space portion 6 to 11T wide: 1.75T Width of the cooling pulse contributing to recording of a mark portion 3T or 4T wide immediately before each space portion: The above-mentioned width of cooling pulse plus 0.25T (Width of Pulse of Preheat Level P5 of Mark Edge Adjusting Section)

Width of preheat pulse immediately before mark portion 6T wide: 1T

Width of preheat pulse immediately before mark portion 5T or 7T wide: 0.5T

Width of preheat pulse immediately before mark portion 4T wide: 0 to 1.0T (varied depending on the heat conducting characteristics of the medium)

(Width of First Pulse of P3 Level in Pulse Train of Information Pulse Section)

Mark portion 3T wide: 1T

Mark portion 4T wide: 1.25T

Mark portion 5T to 11T wide: 1T (Width of Last Pulse of P3 Level in Pulse Train of Information Pulse Section)

Mark portion 3T wide: 1T (same as first pulse)

Mark portion 4T wide: 0.75T to 1T (varied depending on the heat conducting characteristics of the medium)

Mark portion 5T to 11T wide: 1T (Pulse Width of P3 Level Between First Pulse and Last Pulse)

Mark portion 5T to 11T wide: 0.5T (Width of Negative-Going Pulse Between Pulses of P3 Level in Pulse Train of Information Pulse Section)

Mark portion 4T wide: 0.5 to 0.75T (varied depending on the heat conducting characteristics of the medium)

Mark portion 5T to 11T wide: 0.5T

In the case where the 8-16 random modulation signal is recorded with the above-mentioned energy beam pulse waveform, the jitter value is 9% and remains unchanged after overwrite operation. When the cooling pulse is narrowed by 1T or widened by 1T from the above-mentioned state, noises occur due to a residue at the time of overwrite operation and the jitter value is deteriorated to 15% or more.

The waveform shown in FIG. 11 is a preferable record waveform especially in that the jitter level is low, the jitter is not increased even after the overwrite operation is repeated, and the record waveform generating circuit can be simplified, as described above.

Figure 12:
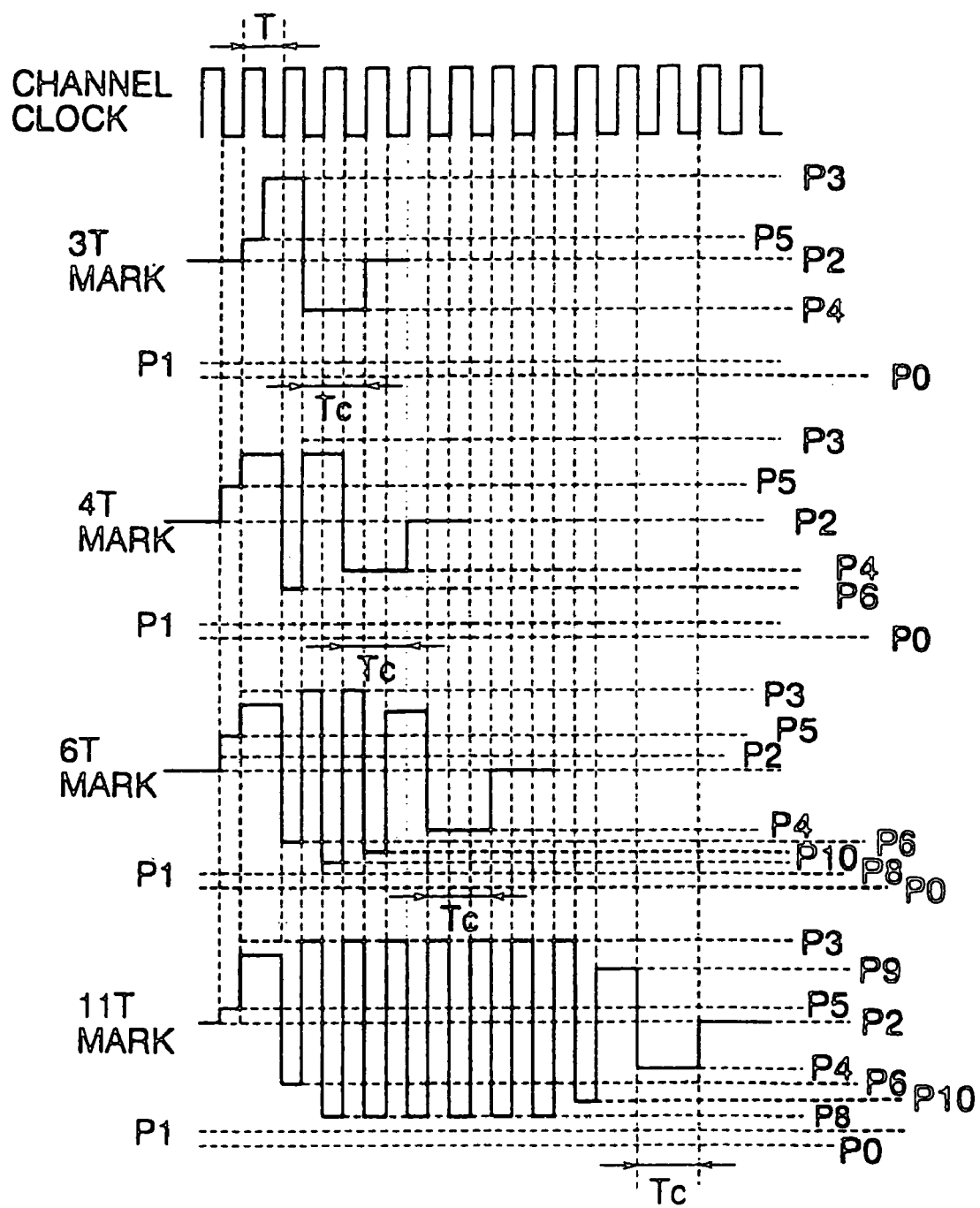

Another example of combinations for waveform control is shown in FIG. 12. In FIG. 12, the relative height between the third, fifth, seventh and ninth power levels is preferably as described below. The relation between the height of power levels and jitters is also described.

$P7 \geq P3 \geq P9 \geq P5$

Further, the relative height between the second, fourth, sixth, eighth and tenth power levels is preferably as described below.

$P2 \geq P6, P10 \geq P4 \geq P8$

The relative height between the first power level and the fourth, sixth, eighth and tenth power levels is preferably as described below.

$P4, P6, P10 \geq P1 \geq P8$

An excessively large circuit size is avoided by assuring that the eighth power level is the same as the tenth power level, and so is by assuring that the seventh power level is the same as the ninth power level. It is also possible to prevent the circuit size from increasing excessively by assuring that at least one of the sixth, eighth and tenth power levels is the same as the fourth power level. Among the sixth, eighth and tenth power levels, an undesirable increase of jitter due to reduction of the circuit structure scale is small when assuring that the tenth power level is the same as the fourth power level.

The above-mentioned energy beam pulse waveform can reduce the jitter ($\sigma$/Tw) by about 18% as compared with the conventional waveform shown in FIG. 3.

In the case where the width of the pulse of the pulse train of the energy beam for forming a mark portion and the width of the cooling pulse are an integer multiple of one half of the channel clock T, the size of the record waveform generating circuit is desirably minimized. The width of the pulse of the energy beam for forming a mark portion is not necessarily T/2, however, but can be T/3, T/4 or an integral multiple of the channel clock divided by an integer. In the case where the channel clock is divided by a greater number, the width described above can be desirably optimized for higher accuracy. Excessive division, however, undesirably increases the circuit size. A desirable compromise, therefore, is T/2 to T/4.

The energy beam pulse waveform according to this embodiment is especially effective when the beam spot diameter (the length along the recording track of the recording medium irradiated with the beam with an intensity at least $1/\exp(2)$ of the intensity at the beam center) is 0.8 µm to 1.3 µm and the shortest bit length is 0.25 to 0.35 µm or the shortest length of the mark portion is in the range of 0.35 µm to 0.5 µm. This is by reason of the fact that as described above, depending on the relation between the beam spot and the length of the mark portion, there is a certain range in which the preceding mark portion is liable to be erased (crystallized) by the succeeding pulse as a feature unique to the phase change recording scheme. This range is given by the beam diameter and the shortest length of the mark portion. In the high-density recording as in the present case, the residue in the broad sense of the word has a considerable effect. Also, an especially great effect results when the signal modulation scheme of EFM or the 8-16 modulation is employed. In respect of the wavelength of the recording light, the range between 630 nm and 670 nm inclusive is especially effective.

Although the power level of each pulse of the energy beam pulse waveform is classified into several types for convenience's sake as described above according to this embodiment, the pulse of each level may develop an overshoot or an undershoot due to the characteristics of an electrical signal. The effect of this invention is not lost as far as an equivalent level is secured in this range.

Also, if an optimum pulse width and an optimum power level are recorded beforehand in a medium as the record waveform information to permit the pulse width of each power level described above to be changed in accordance with the characteristics of the medium, a high-density recording is possible over a very wide range even in the case where the medium cooling rate or the linear velocity for recording (relative speeds of the medium and the laser beam) is changed.

Unless the above-mentioned record waveform information is available, or unless the information recorded using a record waveform having the cooling pulse width determined from the record waveform information can be normally reproduced, then a trial write operation is performed in a trial write area on the information recording medium 1. When the waveform of FIG. 4 is used, for example, information is recorded with each power level and pulse width as trial write parameters, and the waveform with the smallest jitter is used as an optimum record waveform. In this way, the optimum record waveform is determined, and information is recorded in the disk of FIG. 1. Thus, a superior reproduced signal with a jitter of 10% or less is produced.

Figure 5:
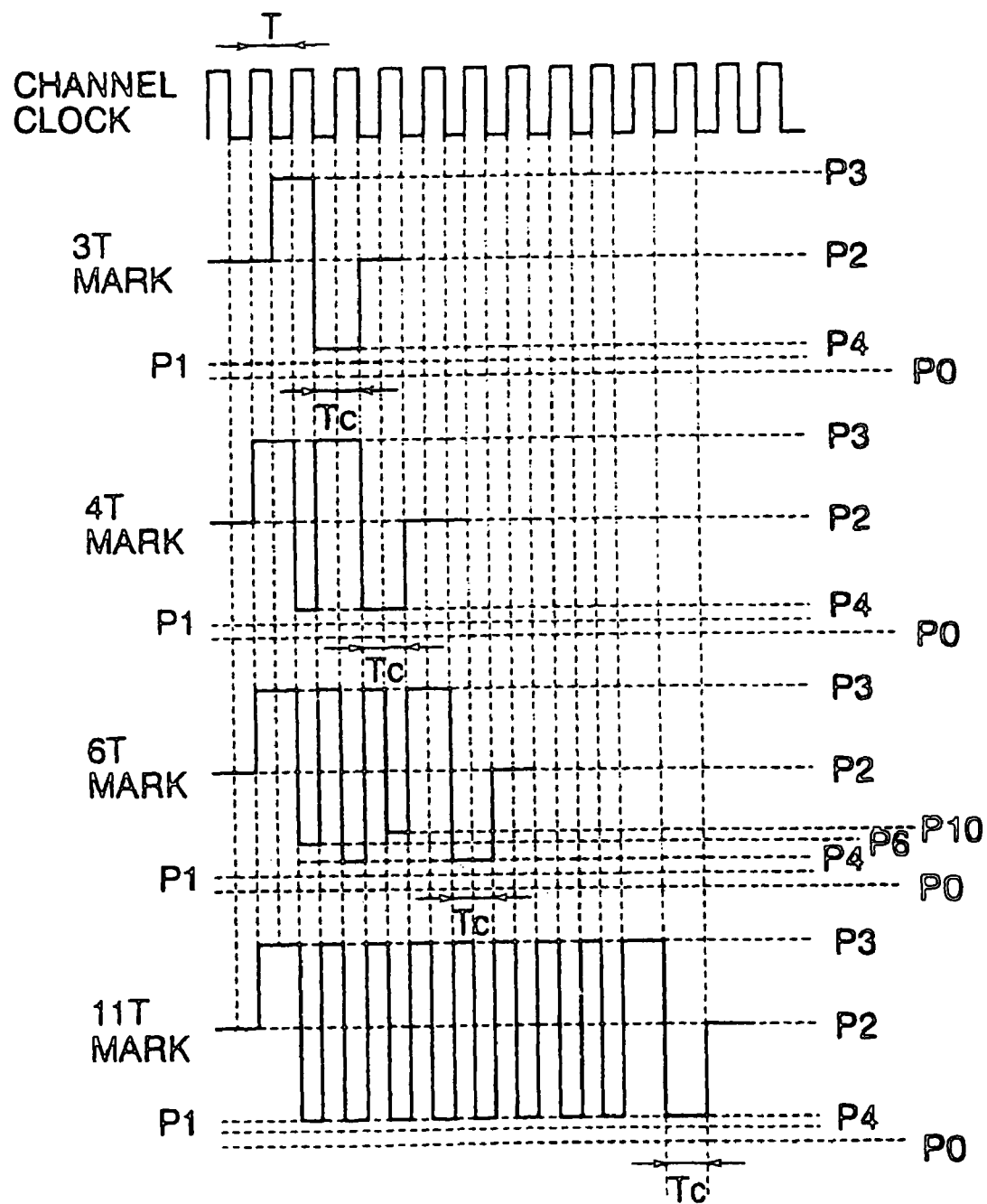

Also, the waveform of FIG. 5 is optimized and used for recording in a manner similar to that for the waveform of FIG. 4. A leading edge jitter value of the signal reproduced from the information recording medium is 11%. The result of a similar optimization and recording for the waveforms of FIGS. 6 and 7 shows that the jitter values of the signals reproduced from the information recording medium are 9% and 8.5%, respectively.

In the case where mark portions are recorded on the lands with the energy beam pulse waveform shown in FIGS. 11 and 12 and other mark portions are recorded in grooves adjacent to the lands with the energy beam pulse waveform shown in FIG. 3, the jitter value of the signal reproduced from the lands begins to be affected from the track offset of about 0.05 μm, and increases to 15% or more when the track offset is 0.10 μm. This is caused by the phenomenon (what is called the cross erasure) in which the marks recorded on the lands are crystallized by the heat generated when mark portions are recorded in the grooves adjacent to the lands. In the case where the mark portions are recorded in the adjacent grooves with the energy beam pulse waveform shown in FIGS. 11 and 12, in contrast, the adjacent tracks are not affected at all even when the track offset of 0.10 μm occurs. This indicates that heat which may be excessively generated for the energy beam pulse waveform shown in FIG. 11 or FIG. 12 (particularly their cooling pulse portions) can be suppressed by adjusting the cooling pulse width to a proper width. This energy beam pulse waveform is seen to be very suitable for high-density recording with the track pitches not more than the laser beam diameter in the land/groove recording system.

The foregoing embodiments are described in detail with reference to the case in which the cooling pulse width is 1.5T. Between 1.25T and 2.5T inclusive, on the other hand, the cross erasure is reduced.

Figure 13:
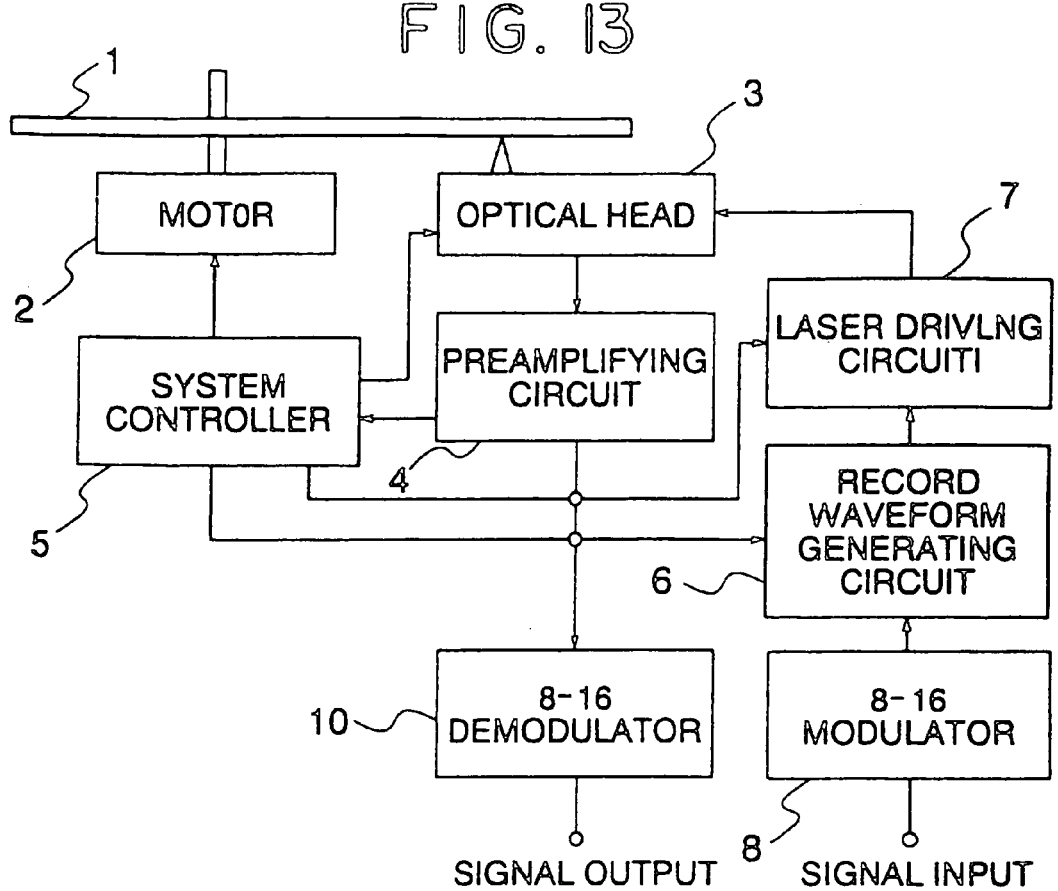
FIG. 13 is a block diagram showing an information recording apparatus according to an embodiment of the invention.

FIG. 13 is a block diagram showing an information recording apparatus according to an embodiment of the invention. An information recording medium 1, after being mounted, is rotated by a motor 2 at the rate of 9 m/s with a constant disk linear velocity. Information on the recordable disk linear velocity is stored together with the record waveform information in advance in the form of pits in the lead-in area along the innermost circumference of the information recording medium 1. The recordable disk linear velocity information read by an optical disk 3 is transferred to a system controller 5 through a pre-amplifier circuit 4. At the same time, information on the record waveform and the optimum recording power are transferred to the system controller 5 through the circuit 4. The system controller 5 controls the motor 2 based on the recordable disk linear velocity information and the radial position information of the optical head 3 and rotates the information recording medium 1 at an appropriate rotational speed.

A record waveform generating circuit 6 has record waveforms (corresponding to, for example, the energy beam pulse waveforms shown in FIG. 12) programmed therein to meet the situation where the time width of the fifth power level, the cooling pulse width and the time width of the third and ninth power levels are 0T, 0.125T, 0.25T, 0.375T, 0.5T, 0.625T, 0.75T, 0.875T, 1.0T, 1.125T, 1.25T, 1.375T, 1.5T, 1.625T, 1.75T, 1.875T, 2.0T, 2.125T, 2.25T, 2.375T and 2.5T. Thus, a record waveform of a cooling pulse width suitable for the information recording medium 1 can be generated based on the record waveform information transferred through the system controller 5. According to the record waveform transferred from the record waveform generating circuit 6, the laser driving circuit 7 causes the semiconductor laser in the optical head 3 to emit light, so that the energy beam for recording a mark portion is radiated in a pulse waveform on the information recording medium 1.

The main operation of the information recording apparatus shown in FIG. 13 will be explained with reference to FIGS. 14 to 17.

Figure 14:
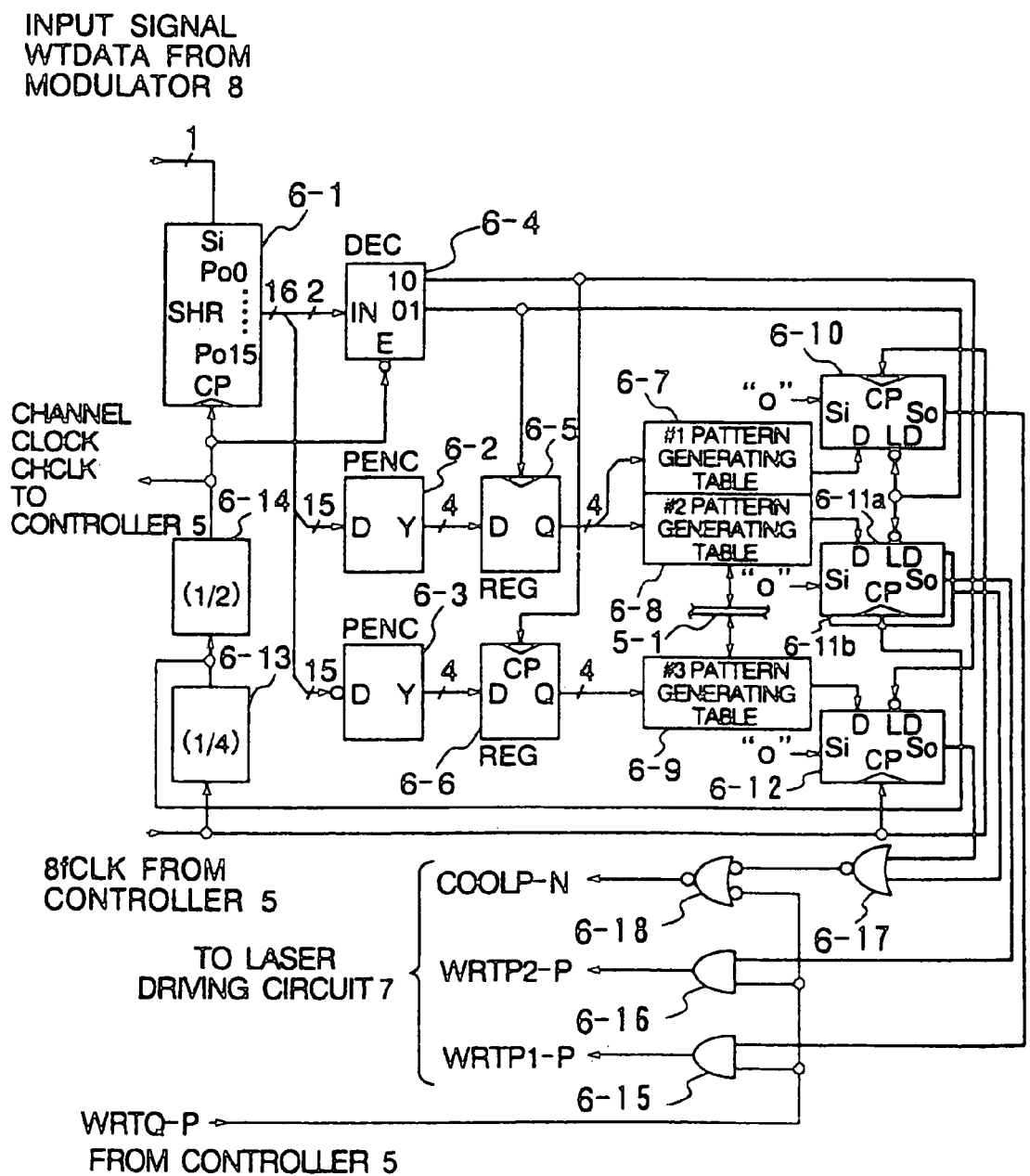
FIG. 14 is a block diagram showing an example of a record waveform generating circuit usable for the apparatus shown in FIG. 13.

FIG. 14 is a functional block diagram showing a configuration of the record waveform generating circuit (block 6 in FIG. 13). A clock 8/CLK eight times higher in frequency than the channel clock is supplied from a system controller (block 5 in FIG. 13) to the circuit 6. From the channel clock 8/CLK, a clock 2/CLK twice as high as the channel clock is generated at a ¼ frequency division counter 6-13. Further, a ½ frequency division counter 6-14 generates a channel clock CHCLK. On the other hand, the recording data input signal WTDATA from the 8-16 modulator 8 is connected to the serial input terminal of a 16-bit shift register 6-1 for input signal, and is shifted at the rise timing of the channel clock CHCLK. Among the parallel outputs of the shift register 6-1, the 15 bits other than the oldest information bit are applied to a priority encoder 62 for detecting the weight of "1" and an inverted priority encoder 6-3 for detecting the weight of "0". The two bits from the oldest information bit side, on the other hand, are applied to a decoder 6-4 for detecting the boundary point between a space portion ("0") and a mark portion ("1") and a boundary point changing from a mark portion ("1") to a space portion ("0"). At the leading edge of the pulse at which the position of change to the mark portion (point where "0" changes to "1") is detected by the decoder 6-4, the numerical value at the point where the output of "1s" to the priority encoder 6-2 is discontinued is stored in a first 4-bit register 6-5. The data in a preheat pattern table 6-7 and a mark pattern table 6-8 (which has two 32-bit tables, though not shown) are accessed. The data thus accessed are loaded in parallel in output shift registers 6-10, 6-11a, 6-11b at the trailing edge of the mark detection pulse. The serial output of the first output shift register 6-10 operated by the clock 8/CLK and the serial output of a second output shift register 6-11a operated by the clock 2/CLK are converted into a first-record pulse signal WRTP1-P and a second record pulse signal WTRP2-P through AND gates 6-15 and 6-16, respectively. At the leading edge of the pulse where the decoder 6-4 detects the position of change to the space portion (point where "1" changes to "0"), the numerical value at the point where the "0s" outputted to the inverted priority encoder 6-3 is discontinued is stored in a second 4-bit register 6-6. Also, at the trailing edge of the space portion detection pulse from the decoder 6-4, the data retrieved from the cooling pattern table 6-9 are loaded in parallel in a fourth output shift register 6-12. At the same time, a serial output synchronous with the channel clock 3N (8/CLK) eight times higher is converted into an inverted 5, cooling pulse signal COOLP-N through a NOR gate 6-17 and a NAND gate 6-18. A write request signal (write gate signal) WRTQ-P generated in the system controller is used as a permission signal for the AND gates 6-15, 6-16 and the NAND gate 6-18, and the serial output of a third output shift register 6-11b is applied as the other input signal to the NOR gate 6-17.

The above-mentioned three types of bit serial data signals WRTP2-P, WRTP1-P and COOLP-N are supplied to a laser driving circuit (block 7 of FIG. 13, described in detail later) thereby to generate various levels of laser driving signals. The contents of the pattern generating tables 6-7, 6-8, 6-9 can be updated from time to time by data transfer from the system control bus 5-1 of the system controller (block 5 of FIG. 13). As a result, it is possible to change the cooling pulse width Tc, etc. (FIGS. 11 and 12) as required.

Figure 15:
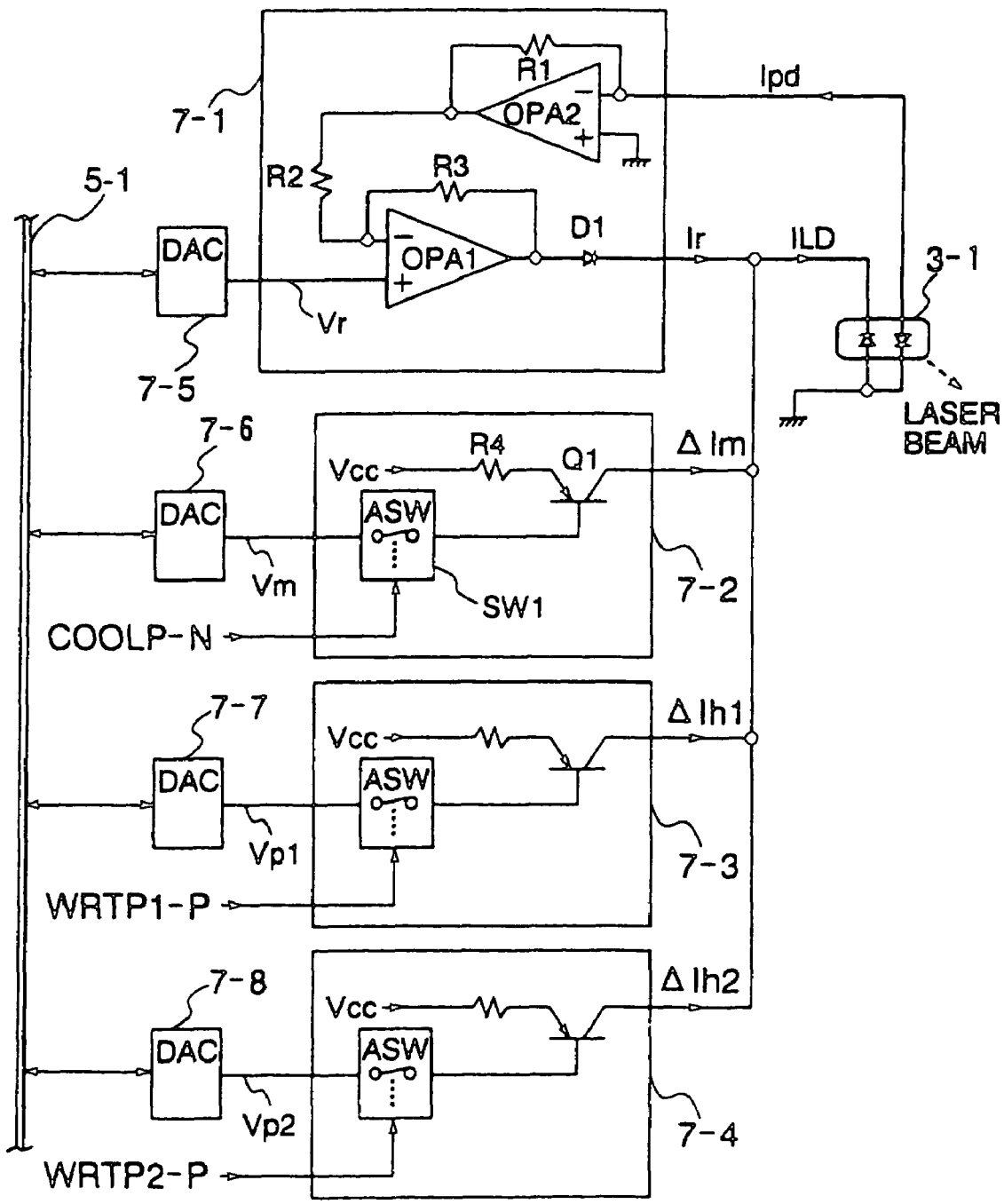
FIG. 15 is a block diagram showing an example of a laser drive circuit usable for the apparatus shown in FIG. 13.

FIG. 15 is a functional block diagram showing the laser driving circuit (block 7 of FIG. 13). This circuit includes an automatic power control (APC) circuit 7-1, three driving current superposition circuits 7-2, 7-3, 7-4 and four D/A converters (DAC) 7-5, 7-6, 7-7, 7-8. The output value Vr (target value of the laser power) of the APC D/A converter 7-5 is set by the data transfer from the system control bus 5-1 of the system controller (block 5 of FIG. 13). On the other hand, the output current Ir is supplied to the semiconductor laser 3-1 to generate a laser beam, which is partially returned to a monitor photo-diode. Thus, a monitor current Ipd flows and is converted into a voltage by the operation of a resistor R1 and an operational amplifier OPA2 (conversion voltage=−Ipd×

R1). The resulting voltage is applied through a resistor R2 to an operational amplifier OPA1 and compared with the output voltage Vr of the D/A converter 5. Thus, the output current Ir is controlled in such a manner that the output voltage of the operational amplifier OPA2 (proportional to the intensity of the laser beam) is balanced with the above-mentioned voltage Vr. The loop gain of the APC circuit is determined by the ratio between resistors R2 and R3, and the diode D1 is for blocking the reverse flow of the superposition current (described later). In the case where the inverted cooling pulse signal COOLP-N is at high level, on the other hand, an analog switch (ASW) SW1 is closed. Under this condition, the output voltage Vm of the first current superposition D/A converter 7-6 set by the data transfer from the system control bus 5-1 of the system controller (block 19 of FIG. 13) is applied to the base of the transistor Q1. Therefore, the erase power Pm (=second power level P2) shown by equation 1 below and the superposition current ΔIm are superposed on the output current Ir.

$$\Delta Im = (Vcc - Vm - 0.7) \div R4 \quad (1)$$

Once the inverted cooling pulse signal COOLP-N turns to low level, the analog switch (ASW) SW1 opens. Therefore, the transistor Q1 turns off and the superposition current ΔIm ceases to flow. In similar fashion, when the first recording pulse signal (WRTP1-P) is at high level, a superposition current ΔIh1 (the superposition current for generating the preheat level power P5. FIGS. 1 to 4) flows. When the second recording pulse signal (WRTP2-P) is at high level, on the other hand, a superposition current ΔIh2 (the superposition current for generating the laser power of third power level) flows.

FIG. 16 is a time chart showing the operation described above. The serial signal input WTDATA representative of a record waveform and in synchronism with the channel clock CHCLK is applied to and sequentially shifted in the shift register SHR (6-1 in FIG. 14), so that pulse information corresponding to a first recording pulse signal "WRTP1-P" (output signal of the AND gate 6-15 in FIG. 14) is set (loaded in parallel) in a shift register (6-10 in FIG. 14) of a length corresponding to 3T (in this embodiment, of a 24 (=8×3) bit length for a resolution of T/8) with a timing of a mark portion detection signal ("01" output of the decoder 6-4 in FIG. 14) indicating a change from a space portion to a mark portion. At the same time, pulse information corresponding to a second recording pulse signal "WRTP2-P" (output signal of the AND gate 6-16 in FIG. 14) constituting a mark portion forming signal or an information pulse section of the energy beam pulse waveform and pulse information corresponding to a mark portion cooling signal (one of the input signals to the NOR gate 6-17 in FIG. 14) are individually set in shift registers (6-11a and 6-11b in FIG. 14) of a length corresponding to 16T (in this embodiment, of a 32 (=2×16) bit length for a resolution of T/2). The individually set data are then sequentially shifted to be outputted as WRTP1-P, WRTP2-P and MSHR SO-2, respectively. In a similar fashion, a space portion cooling pulse information is set in parallel in a shift register 6-12 of a length corresponding to 3T (in this embodiment, of a 24 (=8×3) bit length for a resolution of T/8) with a timing of a space portion detection signal ("10" output of the decoder 6-4 in FIG. 14) indicating a change from a mark portion to a space portion. From a NOR output of the mark portion cooling signal "MSHR SO-2" and the output of the shift register 6-12 in the NOR gate 6-17 in FIG. 14, pulse information "COOLP-N" is obtained. These three laser drive timing signals WRTP2-P, WRTP1-P and COOLP-N are applied to the laser driving circuit shown in FIG. 15, so that a predetermined laser driving current ILD flows to produce a laser beam power as required.

The laser driving circuit 7 shown in FIG. 15 may be partly changed in such a manner that the used transistors are of NPN type, circuitry for using a negative power supply is added and the above-mentioned space portion cooling pulse signal is applied to the added circuit. Thereby, a current subtraction circuit is formed, which facilitates realization of the waveform indicated by dotted line (laser driving current) shown in FIG. 16.

Figure 17:
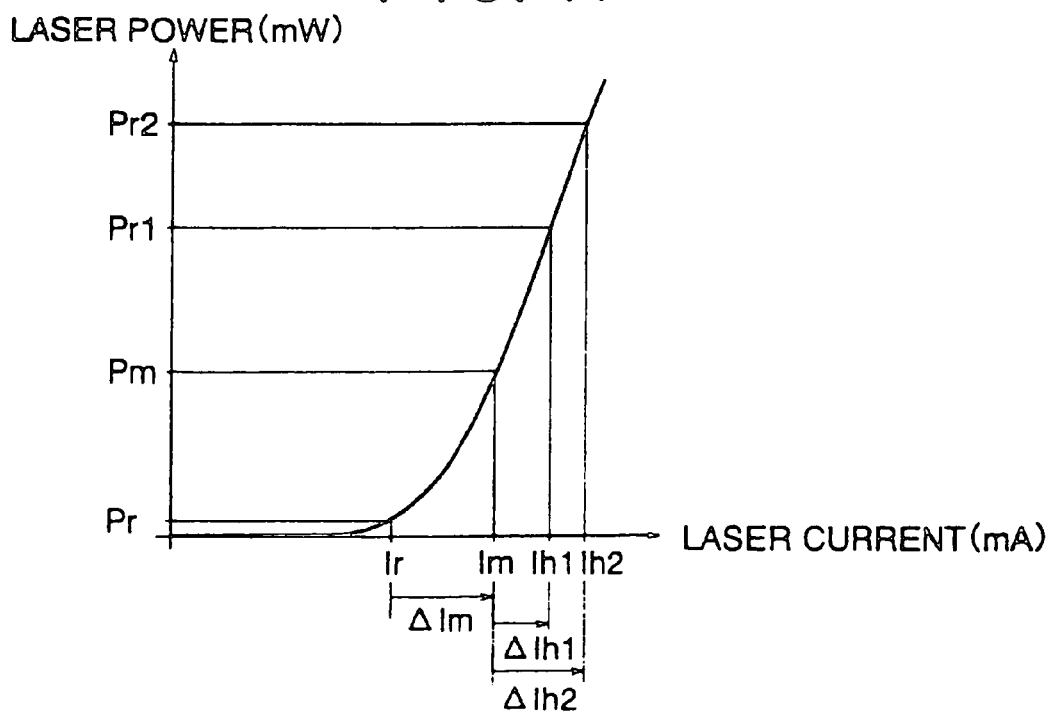
FIG. 17 is a diagram showing an example characteristic of a semiconductor laser usable for the present invention.

FIG. 17 is an I-P (current versus optical beam power) characteristic diagram of a semiconductor laser (3-1 in FIG. 15) according to an embodiment of the invention. When the laser current is Ir milliamperes, the laser beam power is Pr milliwatts. Superposition of ΔIm milliamperes on the current Ir leads to the laser current of Im milliamperes thereby to produce the laser beam power of Pm milliwatts (power level P2). When ΔIh1 milliamperes is further superimposed on Im, the laser current of Ih1 milliamperes flows so that the laser beam power assumes Ph1 milliwatts (power level P5). Similarly, when ΔIh2 milliamperes is superposed on Im, the laser current of Ih2 milliamperes flows, with the result that the laser beam power assumes Ph2 milliwatts (power level P3).

As described above, the information recording apparatus according to this invention comprises a record waveform generating circuit capable of setting and changing the preheat pulse width and the cooling pulse width in units of T/8. Therefore, the requirement of a high disk linear velocity is readily met. Further, a highly accurate information recording becomes possible in an information recording medium having various cooling rates.

As an information recording apparatus, a delay circuit for delaying the trailing edge of a pulse reaching the third power level or the cooling pulse by a predetermined amount can be inserted between the record waveform generating circuit 6 and the laser driving circuit 7 of FIG. 13, for example, in order to adjust the mark portion edge position.

After the first pulse raised to the third power level, part of an area where the melting point is exceeded is liable to be cooled below the melting point, nucleated, and heated again by the succeeding pulse raised to the third power level. Thus, crystal grows, thereby often erasing the information. As described above in detail, however, the method of forming a mark portion of intermediate length by first raising power slightly before raising it to the third power level as between 5T and 7T or by reducing the power following the first record pulse only to a level slightly higher than the first record pulse, has the advantage of preventing the temperature drop to the nucleation temperature, thus avoiding the above-mentioned phenomenon. After the last pulse of the third power level followed by a short space portion, the power is lowered for a slightly longer time or to a slightly lower level. The last-mentioned method lengthens the actual succeeding space portion and reduces the adverse effect on the resolution of the beam spot especially in the case where the succeeding space portion is short.

Specifically, the length of the immediately-succeeding mark portion or space portion is included in the information providing a reference for determining the record waveform of the presently-formed mark portion or space portion. This is effective especially in the high-density recording in which a small residue (a residue in the broad sense of the word, including the effect of a previously-recorded signal pattern on the shape of a new mark portion) has a great effect on the jitter (or shift) at the mark portion edge of the reproduced signal.

As described above, information is recorded using an energy beam pulse train for recording a mark portion, and the power level immediately following the first pulse is set to not lower than the power level immediately following each of the other pulses. By doing so, the width of the front part of the mark portion and the width of the rear part of the mark portion can be controlled independently of each other. This method, therefore, is suitable for high-density recording. In the case where the power level immediately following the first pulse is lower than the power level immediately following each of the other pulses, on the other hand, the energy amount radiated on the front part of the mark portion is insufficient, and therefore the mark portion may assume the form of teardrop.

Also, in the energy beam pulse train for recording a mark portion, the power level of the first pulse is increased as compared with the power level of the last pulse, and the power level immediately following the first pulse is set to not less than the power level immediately following each of the pulses other than the first pulse. In this way, the requirement for a still higher density recording is met.

Controlling the power level of the first pulse and/or the power level of the pulse immediately following the first pulse is effective for controlling the shape of the front part of the mark portion. An especially great effect is exhibited if this control method is combined with the method of controlling the radiation energy of the cooling pulse effective for controlling the shape of the rear part of the mark portion.

Further, if an information recording medium is used in which an amorphous mark portion is recorded in crystal and crystal grains larger than those of the crystal exist around the mark portion, the width of recrystallized area can be easily controlled by the temperature reached and the cooling rate. Therefore, it is difficult for the mark portion to assume the shape of teardrop or inverse teardrop, thereby making it possible to suppress the size variations of the mark portion to a minimum. Thus, a reproduced signal faithful to the record waveform is produced. Nevertheless, the present invention is applicable also to a recording medium of other characteristics such as the one wholly occupied by large crystal grains.

Furthermore, since the cooling rate after recording a mark portion is different between the land and groove of the recording medium, the width of the low-power portion after the pulse train of the third power level can be differentiated according to whether the information is recorded in the grooves or on the lands.

Also, with the energy beam pulse train for recording a mark portion, an especially low jitter value is obtained in the case where the energy of the energy beam charged in the first and last pulses is larger than the energy charged in the other pulses. This effect is conspicuous at the time of high-speed recording when the disk linear velocity is 9 m/s or more or at the time of high-density recording when the length of the shortest mark portion is not more than two third of the laser beam spot diameter.

As described in detail above, the cooling rate of the record film during and after radiation of the energy beam for forming a mark portion can be accurately controlled. Consequently, a medium capable of phase change between crystal and amorphous states (what is called a phase change recording medium) can be used for high-density recording of information. This is due to the fact that the shape of a mark portion recorded in the phase change recording medium depends very sensitively on the cooling rate of the record film after radiation of the energy beam.

The width of the pulse in the above-mentioned energy beam pulse train for forming a mark portion or the width of the low-power portion (cooling pulse) following the pulse train represents the time between a local minimum and a local maximum of the differentiation of the temporal change of energy in the energy beam radiated on the information recording medium. More precisely, it represents the time between a local minimum and a local maximum of the time-differentiated signal of an overriding electrical signal (such an electrical signal as digitized for generating a record waveform). In the case where the time between a local minimum and a local maximum is quantized, the width of quantization is called the pulse width described above. Even in the presence of a minuscule fluctuation of the time between a local minimum and a local maximum of the temporal change of energy in the energy beam radiated on the information recording medium; the effects of the invention are not lost if the fluctuation is one of a minor nature considered to be solely caused by the quantization.

The time referred to above is of course not the absolute one, but the time relative to the clock of the highest order (the channel clock, i.e. a clock corresponding to the basic clock of the electrical signal immediately after passing an EFM modulator, 8-16 modulator or the like). Therefore, in the case where the channel clock undergoes a change in accordance with the relative speed between the energy beam and the information recording medium, the pulse width described above should be defined taking the relation with the changed channel clock into consideration.

The power level described above indicates the one assumed to be sustained considerably long time in each pulse (within the time between a local minimum and a local maximum). In the case where the power level corresponds to the voltage level of an overriding electrical signal (such an electrical signal digitized for generating a record waveform), however, the particular correspondence is taken into account.

Also, as described with reference to the foregoing embodiment, the recording power can be prevented from increasing by recording information using a waveform in which energy is distributed excessively to the leading part and the trailing part of the energy beam pulse train for recording the longest mark portion. Specifically, in the pulse train for forming a mark portion, the power level immediately following the first pulse and the power level immediately before the last pulse are increased as compared with the power level following each of the other pulses.

Further, in the energy beam pulse train for recording a mark portion, the power level immediately following the first pulse is set higher than the power level following each of the pulses other than the first and last pulses but not higher than 200% of the second power level. Also, the shortest mark portion is recorded by two energy beam pulses, the second shortest mark portion is recorded by three energy beam pulses, and the third shortest mark portion is recorded by four energy beam pulses. In addition, the power level between the first and second pulses for recording the shortest mark portion, the power level between the first and second pulses for recording the second shortest mark portion, the power levels between the first and second pulses and between the third and fourth pulses for recording the third shortest mark portion are set between 50% and 170% inclusive of the second power level.

Furthermore, the power level between the second and third pulses for recording the second shortest mark portion and the power level between the second and third pulses for recording the third shortest mark portion are set to not more than 50% of the second power level.

By controlling the power levels described in the above two paragraphs, it is possible to improve the recording sensitivity, and particularly, signal quality after overwriting.

An especially great effect of signal quality improvement is exhibited in the case where in the energy beam pulse train for recording a mark portion, the power level following the first pulse is higher than the power level following each of the pulses other than the first and last pulses but not higher than 200% of the second power level, or more preferably, between 50% and 170% inclusive of the second power level.

Also, in the case where a mark portion of a given length is recorded with three energy beam pulses, the power level immediately following the first pulse can be set to the second power level.

Further, a method considered for improving the recording sensitivity other than those mentioned above consists in increasing the width of the first and last pulses in the energy beam pulse train for recording at least the longest mark portion. In such a case, however, when recording the shortest mark portion or the second or third shortest mark portion, the distance between the first pulse and the last pulse becomes so short that the energy amount radiated per unit area becomes excessive as compared with when recording a comparatively long mark portion such as the longest mark portion, with the result that a comparatively short mark is liable to be long as compared with the normal length. This problem is obviated by the following method.

(a) At least the power level of the pulse for recording the shortest mark portion is lower than the power level of the second pulse for recording the longest mark portion, and/or:
(b) At least the power level of the lowest-power one of the pulses for recording the shortest mark portion is lower than the power level of the second one of the pulses for recording the longest mark portion but not lower than 75% of the power level of the lowest-power one of the pulses for recording the longest mark portion.

In the case where at least the power level for recording the shortest mark portion is lower than the power level of any one of the pulses for recording the longest mark portion, the excessive amount of heat generated for recording the shortest mark portion can be reduced so that a normal length of the shortest mark portion can be secured. Further, in the case where the power level for recording the second or third shortest mark portion is lower than the second power level for recording the longest mark portion, the excessive heat amount generated for recording the second or third shortest mark portion can be more preferably reduced thereby to secure a normal length of the second or third shortest mark portion, as the case may be. In the process, assume that the pulse level is increased with the increase of the length of the mark portion to be recorded. Then, the amount of energy radiated per unit area for recording all the mark portions is averaged out, and a normal length can be secured for all the mark portions, thereby making this method more suitable for high-density recording.

Also, the quality of the reproduced signal is improved and the effect of lowering the power level is exhibited for recording the shortest mark portion as compared with any one of the power levels for recording the longest mark portion, in the case where the power level of the pulse for recording the shortest mark portion is not lower than about 75% of the power level of the lowest-power pulse for recording the longest mark portion. An especially great effect is produced when the power level for recording the shortest mark portion is between 85% and 95% inclusive of the power level of the second pulse for recording the longest mark portion. On the other hand, the effect of the invention is not produced in the case where the power level for recording the shortest mark portion is lower than 75% of the power level of the second pulse for recording the longest mark portion.

In the energy beam pulse train for recording a mark portion, the width of the first and last pulses reaching the third power level is increased as compared with the width of those other than the first and last pulses reaching the third power level, and at least the power level of the pulse for recording the shortest mark portion is set lower than the power level of the second pulse for recording the longest mark portion. By using such a waveform, the recording sensitivity is improved and a superior recording operation can be performed.

Also, the cooling pulse can be arranged after other power levels or, for example, the second power level for a short time, instead of immediately following the last pulse in an energy beam pulse train for recording a mark portion.

The invention claimed is:

1. A device for recording information in a recording medium capable of being set in a first state with an energy beam at a first power level and in a second state with an energy beam at a second power level higher than said first power level, said energy beam and said recording medium being moved relatively to each other while radiating said energy beam on said recording medium thereby to record information on said recording medium, the device comprising:
    means for immediately after irradiation of said recording medium with an energy beam pulse at said second power level, irradiating said recording medium with an energy beam pulse at a third power level lower than said first power level, said third power level being kept for a first pulse duration; and
    means for controlling said first pulse duration of said third power level depending on a length of a space portion to be recorded on said recording medium.

2. An information recording device according to claim 1, wherein said first state is a crystallized state, and said second state is an amorphous state.

* * * * *